United States Patent
Wu et al.

(10) Patent No.: US 12,474,443 B2
(45) Date of Patent: Nov. 18, 2025

(54) RADAR COMMUNICATION WITH INTERFERENCE SUPPRESSION

(71) Applicant: NXP B.V., Eindhoven (NL)

(72) Inventors: Ryan Haoyun Wu, San Jose, CA (US); Jun Li, San Jose, CA (US); Christian Tuschen, Holzkirchen (DE)

(73) Assignee: NXP B.V., Eindhoven (NL)

( * ) Notice: Subject to any disclaimer, the term of this patent is extended or adjusted under 35 U.S.C. 154(b) by 297 days.

(21) Appl. No.: 18/453,931

(22) Filed: Aug. 22, 2023

(65) Prior Publication Data
US 2023/0393236 A1 Dec. 7, 2023

Related U.S. Application Data

(63) Continuation-in-part of application No. 17/245,613, filed on Apr. 30, 2021, now abandoned.

(51) Int. Cl.
*G01S 7/35* (2006.01)

(52) U.S. Cl.
CPC ............. *G01S 7/354* (2013.01); *G01S 7/356* (2021.05)

(58) Field of Classification Search
CPC .......... G01S 7/356; G01S 7/023; G01S 7/354; G01S 7/2813; G01S 7/2922
USPC ................. 342/159, 115, 192, 179, 195, 196
See application file for complete search history.

(56) References Cited

U.S. PATENT DOCUMENTS

| | | | | |
|---|---|---|---|---|
| 5,271,404 A | * | 12/1993 | Corl | G01P 5/244 73/861.25 |
| 6,469,662 B2 | * | 10/2002 | Tullsson | G01S 7/0232 342/159 |
| 8,344,944 B2 | * | 1/2013 | Goodman | G01S 7/2923 342/194 |
| 8,454,528 B2 | * | 6/2013 | Yuen | A61B 5/113 600/407 |
| 8,694,306 B1 | * | 4/2014 | Short | G10L 15/14 704/200 |
| 9,628,122 B1 | | 4/2017 | Clark et al. | |
| 9,806,747 B1 | | 10/2017 | Clark et al. | |

(Continued)

FOREIGN PATENT DOCUMENTS

| | | |
|---|---|---|
| CN | 106054123 A | 6/2016 |
| CN | 106019213 A | 10/2016 |

OTHER PUBLICATIONS

Non Final Office Action: U.S. Appl. No. 17/245,613; 18 pages (Nov. 6, 2023).

(Continued)

*Primary Examiner* — Michael W Justice
(74) *Attorney, Agent, or Firm* — Andrew C. Milhollin

(57) ABSTRACT

Aspects of the present disclosure relate to a radar system and method of operation thereof, whereby a spectrogram is generated by processing circuitry of a radar system by converting samples, of reflections of transmitted radar signals reflected by an object in an environment of the radar system, into a time-frequency domain, determining at least one threshold based on at least one MIN-of-MAX value for magnitudes of a frequency signal of the spectrogram, generating an interference-suppressed spectrogram by removing or attenuating interference components from the spectrogram based on the at least one threshold, and generating interference-suppressed samples based on the interference-suppressed spectrogram.

20 Claims, 13 Drawing Sheets

(56) References Cited

U.S. PATENT DOCUMENTS

| | | | |
|---|---|---|---|
| 9,870,641 | B2 | 1/2018 | Anderson et al. |
| 9,952,720 | B2 | 4/2018 | Schwartz et al. |
| 10,048,355 | B2* | 8/2018 | Lim .................. G01S 13/34 |
| 10,067,221 | B2 | 9/2018 | Ginsburg et al. |
| 10,249,318 | B2* | 4/2019 | Kaniewska ......... G10L 21/0388 |
| 10,429,494 | B2* | 10/2019 | Lee .................. G01S 13/931 |
| 10,704,970 | B1 | 7/2020 | Brown et al. |
| 10,879,946 | B1* | 12/2020 | Shima ................. G06F 17/14 |
| 11,313,943 | B2 | 4/2022 | Moss et al. |
| 11,394,475 | B1 | 7/2022 | Vaca et al. |
| 11,448,727 | B2* | 9/2022 | Ozturk ................ G01S 7/354 |
| 11,448,752 | B2 | 9/2022 | Wennersten et al. |
| 11,644,565 | B2 | 5/2023 | Li et al. |
| 11,681,011 | B2 | 6/2023 | Meissner et al. |
| 12,174,289 | B2* | 12/2024 | Chi .................. G01S 13/5244 |
| 12,347,159 | B2* | 7/2025 | Dey .................. G01S 13/505 |
| 2002/0027522 | A1* | 3/2002 | Tullsson ................ G01S 7/36 342/132 |
| 2009/0009661 | A1 | 1/2009 | Murakami et al. |
| 2010/0130873 | A1* | 5/2010 | Yuen ................. A61B 5/113 600/595 |
| 2010/0152600 | A1* | 6/2010 | Droitcour ............ A61B 5/7221 600/534 |
| 2010/0240999 | A1* | 9/2010 | Droitcour ............ A61B 5/113 600/453 |
| 2010/0249630 | A1* | 9/2010 | Droitcour ............ G01S 13/88 607/42 |
| 2010/0249633 | A1* | 9/2010 | Droitcour ............ A61B 5/05 600/534 |
| 2010/0292568 | A1* | 11/2010 | Droitcour ............ G01S 13/88 600/425 |
| 2012/0026031 | A1* | 2/2012 | Goodman ............ G01S 7/2923 342/159 |
| 2014/0070983 | A1* | 3/2014 | Maalouli ............. G01S 13/02 342/192 |
| 2014/0079248 | A1* | 3/2014 | Short ................. G10L 25/18 381/119 |
| 2016/0124084 | A1* | 5/2016 | Lim .................. G01S 13/931 342/160 |
| 2017/0184702 | A1* | 6/2017 | Lee .................. G01S 7/354 |
| 2017/0270946 | A1* | 9/2017 | Kaniewska ............ G10L 25/93 |
| 2019/0011533 | A1 | 1/2019 | Ginsburg et al. |
| 2019/0129020 | A1* | 5/2019 | Huang ............... A61B 8/5207 |
| 2021/0231789 | A1* | 7/2021 | Chi .................. G01S 7/023 |
| 2021/0365778 | A1* | 11/2021 | Dey .................. G06V 40/20 |
| 2021/0373144 | A1 | 12/2021 | Amani et al. |
| 2022/0026530 | A1* | 1/2022 | Wu .................. G01S 7/006 |

OTHER PUBLICATIONS

Notice of Allowance; U.S. Appl. No. 17/185,115; 13 pages (Nov. 9, 2023).

Athley, Fredrik et al; "Model-Based Detection and Direction of Arrival Estimation in Radar Using Sparse Arrays"; Conf. Record of the 38th Asilomar Conf. on Signals, Systems and Computers, Pacific Grove, CA USA; vol. 2; pp. 1953-1957 (Nov. 2004).

Xu, Di et al; "Optimization Design of CS-MIMO Radar Sparse Random Array"; 2016 CIE Int'l Conf. on Radar, Guangzhou, China; 4 pages (2016).

* cited by examiner

RADAR COMMUNICATION WITH INTERFERENCE SUPPRESSION

CROSS-REFERENCE TO RELATED APPLICATIONS

This is a continuation-in-part of co-pending application Ser. No. 17/245,613, filed on Apr. 30, 2021, the teachings of which are incorporated by reference herein in their entirety.

TECHNICAL FIELD

Aspects of various embodiments are directed to processing radar signal reflections to characterize a target, with interference suppression.

BACKGROUND

Radar communications are susceptible to interference, as may come from other radars or a variety of sources. This interference can pose challenges to accurately and adequately processing received radar signal reflections. A variety of approaches have been implemented for mitigating such interference, or otherwise processing signals with the interference. However, many such approaches result in undesirably low signal-to-noise ratio (SNR), for instance as may relate to the loss of samples. Mitigation of interference can be particularly challenging when an interfering radar system's chirps are moderately to highly correlated to chirps to be processed in frequency and in time.

These and other matters have presented challenges to efficiencies of radar communications, for a variety of applications.

SUMMARY

Various example embodiments are directed to issues such as those addressed above and/or others which may become apparent from the following disclosure concerning the communication and processing of radar signals, with suppression of interference.

In an example embodiment, a radar system includes communication circuitry configured to transmit radar signals and to receive reflections of the transmitted radar signals reflected by an object in an environment of the radar system and processing circuitry. The processing circuitry is configured to generate a spectrogram by converting samples of the reflections into a time-frequency domain, determine at least one threshold based on at least one MIN-of-MAX value for magnitudes of a frequency signal of the spectrogram, generate an interference-suppressed spectrogram by removing or attenuating interference components from the spectrogram based on the at least one threshold, and generate interference-suppressed samples based on the interference-suppressed spectrogram.

In one or more embodiments, the processing circuitry is configured to generate the spectrogram by performing a Short Time Fourier Transform (STFT) on the samples of the reflections.

In one or more embodiments the processing circuitry is configured to generate the interference-suppressed samples by performing an inverse STFT on the interference-suppressed spectrogram.

In one or more embodiments, the processing circuitry is configured to determine the at least one threshold by determining, as thresholds, MIN-of-MAX values for each of the frequency signals of the spectrogram.

In one or more embodiments, the processing circuitry is configured to generate the interference-suppressed spectrogram by identifying cells of the spectrogram having magnitudes exceeding respective MIN-of-MAX values determined for respective frequency signals of those cells, and generating the interference-suppressed spectrogram by setting cell values of the identified cells of the spectrogram to zero.

In one or more embodiments, the at least one threshold includes a first global threshold, and the processing circuitry is further configured to determine the at least one threshold by determining a first set of MIN-of-MAX values including a respective MIN-of-MAX value for each frequency signal of the spectrogram, and determining the first global threshold based on a maximum of the first set of MIN-of-MAX values.

In one or more embodiments, the processing circuitry is configured to generate a first zeroing mask by setting each cell of the spectrogram having a magnitude that exceeds the first global threshold to zero, and setting each cell of the spectrogram having a magnitude that is less than or equal to the first global threshold to one.

In one or more embodiments, the at least one threshold further includes a second global threshold, and the processing circuitry is further configured to determine the at least one threshold by generating a matrix of spectrogram magnitudes for the spectrogram, applying a high pass filter response to the matrix of spectrogram magnitudes to generate a weighted matrix of spectrogram magnitudes, determining a second set of MIN-of-MAX values including a respective MIN-of-MAX value for each frequency signal of the weighted matrix of spectrogram magnitudes, and determining the second global threshold based on a maximum of the second set of MIN-of-MAX values.

In one or more embodiments, the processing circuitry is configured to generate a second zeroing mask by setting each cell of the weighted matrix of spectrogram magnitudes having a cell value that exceeds the second global threshold to zero, and setting each cell of the weighted matrix of spectrogram magnitudes having a cell value that is less than or equal to the second global threshold to one.

In one or more embodiments the processing circuitry is configured to generate the interference-suppressed spectrogram by computing the element-wise product of each of the spectrogram and each of the first zeroing mask and the second zeroing mask.

In an example embodiment, a method may include generating, by processing circuitry of a radar system, a spectrogram by converting samples, of reflections of transmitted radar signals reflected by an object in an environment of the radar system, into a time-frequency domain, determining, by the processing circuitry, at least one threshold based on at least one MIN-of-MAX value for magnitudes of a frequency signal of the spectrogram, generating, by the processing circuitry, an interference-suppressed spectrogram by removing or attenuating interference components from the spectrogram based on the at least one threshold, and generating, by the processing circuitry, interference-suppressed samples based on the interference-suppressed spectrogram.

In one or more embodiments, generating the spectrogram includes performing a Short Time Fourier Transform (STFT) on the samples of the reflections.

In one or more embodiments, generating the interference-suppressed samples includes performing an inverse STFT on the interference-suppressed spectrogram.

In one or more embodiments, determining the at least one threshold includes determining, as thresholds, MIN-of-MAX values for each of the frequency signals of the spectrogram.

In one or more embodiments, generating the interference-suppressed spectrogram includes identifying cells of the spectrogram having magnitudes exceeding respective MIN-of-MAX values determined for respective frequency signals of those cells, and generating the interference-suppressed spectrogram by setting cell values of the identified cells of the spectrogram to zero.

In one or more embodiments, the at least one threshold includes a first global threshold, and determining the at least one threshold includes determining a first set of MIN-of-MAX values including a respective MIN-of-MAX value for each frequency signal of the spectrogram, and determining the first global threshold based on a maximum of the first set of MIN-of-MAX values.

In one or more embodiments, the method further includes generating a first zeroing mask by setting each cell of the spectrogram having a magnitude that exceeds the first global threshold to zero, and setting each cell of the spectrogram having a magnitude that is less than or equal to the first global threshold to one.

In one or more embodiments, the at least one threshold further includes a second global threshold, and determining the at least one threshold further includes generating a matrix of spectrogram magnitudes for the spectrogram, applying a high pass filter response to the matrix of spectrogram magnitudes to generate a weighted matrix of spectrogram magnitudes, determining a second set of MIN-of-MAX values including a respective MIN-of-MAX value for each frequency signal of the weighted matrix of spectrogram magnitudes, and determining the second global threshold based on a maximum of the second set of MIN-of-MAX values.

In one or more embodiments, the method further includes generating a second zeroing mask by setting each cell of the weighted matrix of spectrogram magnitudes having a cell value that exceeds the second global threshold to zero, and setting each cell of the weighted matrix of spectrogram magnitudes having a cell value that is less than or equal to the second global threshold to one.

In one or more embodiments, generating the interference-suppressed spectrogram includes computing the element-wise product of each of the spectrogram and each of the first zeroing mask and the second zeroing mask.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
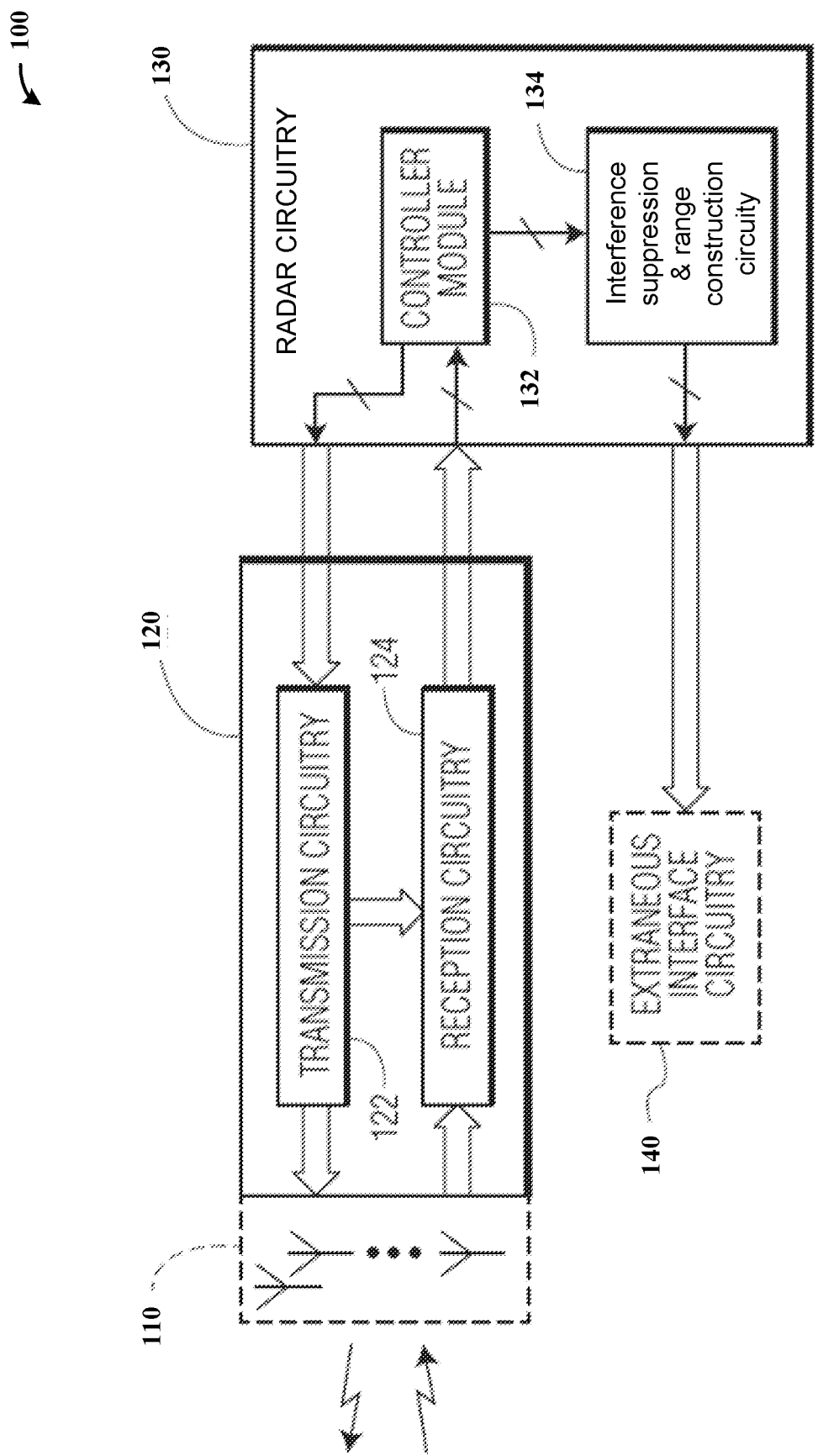
FIG. 1 shows a radar apparatus, as may be implemented in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving radar signal processing relative to interference in the signals. In certain implementations, aspects of the present disclosure have been shown to be beneficial when used in the context of removing interference from reflected radar signals, which may improve subsequent processing of such signals for ascertaining positional characteristics of objects in an environment. In some embodiments, time-based radar signal reflections are converted into a frequency domain. Portions of those signals in which interference is strong are identified and used to set a threshold magnitude of desirable signals that is sufficient to provide useful data. Portions of the signals that exceed such a threshold may be identified as interference and either attenuated, suppressed, discarded, set to zero value or otherwise not used, and the desirable signals in the frequency domain can be used to reconstruct the reflections (e.g., as a range response with interference removed). While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various aspects of the disclosure are directed to linear frequency modulation (LFM) automotive radars that operate in highly congested spectrum environments, such as those in which LFM radars severely interfere with each other. For instance, various aspects are directed to embodiments in which vehicles may be equipped with one or multiple automotive radar systems. Raw analog-to-digital convertor (ADC) samples may be processed to remove interference components before subsequent processing is carried out.

In some implementations, portions of converted radar reflections exhibiting strong interference are identified, based on an interference threshold that is sufficient to provide useful data, and those signals within the threshold are utilized in determining a range response for a target. In certain instances, raw ADC samples are processed to remove interference components before subsequent range, Doppler, and angle processing are carried out. The removal of interference components may be achieved by 1) producing a spectrogram using short-time Fourier Transform (STFT); 2) for each STFT frequency signal, determining a suppression threshold based on statistical analysis; 3) for each STFT frequency signal, suppressing interference by attenuating spectrogram samples that are above the threshold or otherwise setting spectrogram samples that are above the threshold to zero; and 4) constructing an interference-suppressed signal (e.g., a range response). Accordingly, portions of the interference signal may be selectively removed in the time-frequency domain, which may provide desirable interference removal (e.g., with interference appearing as chirps in sinusoidal tones), facilitating signal recovery in severely interfered environments.

In some instances, the fourth step noted above includes computing an inverse STFT of the interference-suppressed spectrogram and obtaining interference-suppressed ADC samples for subsequent processing. Alternatively, a sparse linear regression problem model may be constructed, with the interfered-suppressed spectrogram as an observation vector, in which the range spectrum is estimated using a sparse signal estimation approach. This may reduce ambiguous sidelobes and retain the SNR of a target signal.

In a particular example, a long signal is broken into chunks corresponding to relatively smaller time windows, and a time frequency output is used to generate an interference detection threshold. Given a spectrogram for every spectral line/row, a threshold may be produced, and a histogram analysis may identify a target signal magnitude. A threshold to identify signals above that magnitude as being noise can be set, and each element of the spectral row may be checked against the threshold.

Range responses may be constructed using a variety of approaches. In one embodiment, time-frequency domain spectrogram thresholding and attenuating or zeroing interference cancellation is carried out. ADC samples are processed in the time-frequency domain for thresholding and attenuating or zeroing out of interference components (e.g., in a spectrogram of the samples). Interfering LFM radar signals may be identified as low-pass filtered linear-ramp signals, such as chirps, after deramp mixing. Interference signals may be ascertained via distinct non-zero-slope linear features in a spectrogram for all interference signals, and post-mixer interference "chirps" in this context cross targets' flat tones in time and frequency. Spectrogram samples that are likely belonging to interference are thus identified and attenuated, removed, or otherwise not used, which further mitigates degradation of a target (received) signal. Once the interference components are removed in the time-frequency domain, the spectrogram may be converted back to time-domain ADC samples, with the subsequent processes being carried out in accordance with further radar processing. Removal of the interference components in the time-frequency domain may be carried out by zeroing or nulling, or by applying attenuations to the interference components in general.

Another embodiment is directed to nulled spectrogram sparse linear regression for radar range spectrum estimation in a radar environment subject to interference. A received ADC signal, once represented in the spectrogram domain (e.g., via STFT), is processed so that interfered samples can be removed or otherwise suppressed in the time-frequency domain by thresholding and attenuation or zeroing. The interfered-sample-removed spectrogram can then be inverse STFT'd back to the time domain and to produce interference-suppressed ADC samples. In certain implementations, operations are carried out to improve SNR and suppress range spectrum ambiguous sidelobes. For instance, an interfered sample detection threshold may be determined in each frequency signal of the spectrogram to determine which spectrogram "pixel" is more likely to contain interference. The interference-free range spectrum signal may be modelled using the spectrogram pixels that are deemed interference-free and the range spectrum may be estimated accordingly. Deletion of an interfered time-frequency sample may be quasi random, such that the resulting model better meets a sparse signal recovery criterion that ensures reliable reconstruction of the sparse range spectrum signal. After the removal of time-frequency interference samples, a nulled spectrogram sparse linear regression approach may be used to reconstruct the range spectrum to retain SNR as well as mitigate ambiguous sidelobes.

In accordance with a particular embodiment, an apparatus includes processing circuitry that is configured to produce a spectrogram by converting reflections of radar signals from a target into a time-frequency domain using a time-frequency analysis. The processing circuitry may determine at least one suppression threshold for at least one frequency signal in the spectrogram based on frequency characteristics of the converted reflections (e.g., based on statistical analysis). The processing circuitry may further be configured to construct a range response characterizing the target and having interference signals removed in the time-frequency domain by converting, into the range response, selected ones of the frequency signals in the spectrogram having a magnitude within the suppression threshold. Accordingly, radar reflections (e.g., signals from an ADC in a receiver) may be processed to remove noise in the time-frequency domain), and further processed to provide an output useful in characterizing the target's position.

In various implementations, the apparatus includes communication circuitry configured to transmit the radar signals and to receive the reflections of the transmitted radar signals from the target, with the processing circuitry configured therewith to process the reflections. For instance, one or more transmitters and receivers with related antennae may operate to transmit and receive multiple radar signals and their reflections.

The processing circuitry may construct the range response in a variety of manners, with the response characterizing aspects of the target via the received reflections. In a particular implementation, the processing circuitry suppresses interference components of the spectrogram that are above the one or more suppression thresholds, therein providing an interference-suppressed spectrogram. The interference-suppressed spectrogram may be converted into interference-suppressed reconstructed reflections using an inverse time-frequency analysis. The reconstructed reflections may be transformed to the range response using a frequency analysis.

In certain embodiments, the processing circuitry converts the reflections into a time-frequency domain using a STFT. The range response is constructed by performing an inverse STFT on the selected frequency signals to provide reconstructed reflections, and performing an inverse frequency transform on the reconstructed reflections to generate an output including the range response.

The processing circuitry may construct the range response by reducing ambiguous sidelobes of the reflections. This may include constructing a sparse linear regression problem model with the selected frequency signals as an observation vector, and constructing the range response using sparse signal estimation.

In a more particular embodiment, the processing circuitry is configured to produce the spectrogram by producing samples of the reflected signals in respective time windows, and to determine the suppression threshold by determining a suppression threshold for each time window. The processing circuitry is further configured to construct the range response by converting, for each time window, selected ones of the frequency signals in the time window having a frequency within the suppression threshold for that time window.

The suppression threshold may be set in one or more of a variety of manners. For instance, for at least one frequency signal, a target signal magnitude may be determined and the suppression threshold may be set for that frequency signal as a magnitude that exceeds the target signal magnitude. In certain implementations, a suppression threshold may be set for each spectral line in the spectrogram by identifying a target signal magnitude for each spectral line. The suppression threshold for each spectral line may be set as a magnitude that exceeds the target signal magnitude for that spectral line. This may be carried out for multiple spectral lines, and the range response may be constructed by, for each spectral line, converting ones of the frequency signals in the spectral line within the suppression threshold for that spectral line. One or more of the suppression thresholds may be set using a histogram analysis to identify a target signal magnitude in which signals above the target signal magnitude are identified as being interference.

The suppression thresholds may be set according to the lowest target magnitude levels that a particular system is designed to process. As such, the thresholds may not set to be lower than such levels to prevent undesirable removal of target signal. Each frequency signal of the spectrogram may correspond to a physical section of ranges in which the target may reside. The lowest target magnitude level may vary with the frequency of the spectrogram as the target magnitude reduces with range.

In various contexts, the suppression threshold may be set to reflect a magnitude, as may relate to a complex amplitude of a frequency signal represented in the spectrogram. Accordingly, a time-frequency analysis can be performed to obtain a spectrogram, and select ones of time-frequency components in the spectrogram (over time) are utilized to provide a range response. For instance, some of the spectrogram components may be suppressed by setting their value to zero or otherwise not using the components, with the remaining components being used.

Various embodiments are directed toward methods for suppressing interference in radar reflections, as may be implemented in connection with the operation of apparatuses as characterized herein. Accordingly, various methods may be carried out in accordance with the above discussion. For instance, in a particular embodiment, a spectrogram is produced by converting reflections of radar signals received from a target, into a time-frequency domain using a time-frequency analysis. One or more suppression thresholds may be determined for at least one frequency signal in the spectrogram, based on frequency characteristics of the converted reflections (e.g., using a histogram analysis and/or statistical analysis) and, for example, the minimum target magnitude levels the system is designed to process. A range response may be constructed, which characterizes the target with interference signals therein removed or otherwise suppressed in the time-frequency domain. For instance, selected ones the reflections in the time-frequency domain as characterized by frequency signals in the spectrogram and having a magnitude within the suppression threshold may be converted (e.g., into the range response).

Constructing the range response may include suppressing interference components of the spectrogram that are above the one or more suppression thresholds and therein providing an interference-suppressed spectrogram, converting the interference-suppressed spectrogram into interference-suppressed reconstructed reflections using an inverse time-frequency analysis, and transforming the reconstructed reflections to the range response using a frequency analysis. The reflections may be converted into a time-frequency domain using a STFT, with the range response being constructed by performing an inverse STFT on the selected frequency signals to provide reconstructed reflections, and performing an inverse frequency transform on the reconstructed reflections to generate an output including the range response.

The suppression thresholds may be set by determining, for at least one frequency signal, a target signal magnitude and setting the suppression threshold for that frequency signal as a magnitude that exceeds the target signal magnitude. The suppression thresholds for each spectral line in the spectrogram may be determined identifying a target signal magnitude for each spectral line, and setting the suppression threshold for each spectral line as a magnitude that exceeds the target signal magnitude for each spectral line. The range response may then be constructed by, for each spectral line, converting ones of the frequency signals in the spectral line within the suppression threshold for that spectral line.

The range response may be constructed by setting values of ones of the frequency signals that are above the threshold to zero, and/or by reducing ambiguous sidelobes of the reflections in which a sparse linear regression problem model is constructed with the selected frequency signals as an observation vector with sparse signal estimation used to construct the range response.

In certain implementations, samples of the reflected signals are produced/used in respective time windows, and one or more suppression thresholds are determined for each time window. Selected ones of the frequency signals in the time window having a frequency within the suppression threshold for that time window may be converted for constructing the range response.

In one or more embodiments, a local MIN-of-MAX thresholding technique may be applied by the processing circuitry (e.g., by a signal processor thereof) when performing interference cancellation. For example, a signal processor of the processing circuitry, during such an interference cancellation process, may be configured to compute a spectrogram by applying an STFT to input ("raw") ADC samples. These ADC samples may be obtained by first receiving signals that are reflected by one or more objects in the environment of the radar system using one or more receive (RX) antennas, then processing the received signals using receiver modules and ADC coupled to each RX antenna. The spectrogram may include a matrix of spectrogram samples, each spectrogram sample representing the magnitude of one or more received signal(s) at a particular time and frequency or a particular time bin and frequency bin.

The signal processor may compute the absolute value (magnitude) of each spectrogram sample of the spectrogram to generate a matrix of spectrogram magnitudes. The signal processor may determine respective thresholds for each frequency signal (row) of the spectrogram based on MIN-of-MAX values determined for each row of the matrix of spectrogram magnitudes. The MIN-of-MAX value for a frequency signal (row of the matrix of spectrogram magnitudes) is determined by first dividing the magnitude samples into multiple segments, then computing the maximum value of each segment, and lastly computing the minimum value of the previously computed maximum values. The signal processor may generate an interference-suppressed spectrogram by attenuating or otherwise zeroing (nulling) out any sample (i.e., cell) of the spectrogram having a magnitude that is greater than the threshold associated with the row of the spectrogram in which that sample is located. The signal processor may compute an inverse STFT of the interference-suppressed spectrogram to generate interference-suppressed ADC samples. The signal processor may process the interference-suppressed ADC samples, such as by performing range compression, Doppler compression, peak detection, angle processing, target tracking, or other suitable radar processing steps based on the interference-suppressed ADC samples.

By using this MIN-of-MAX-based thresholding and zeroing approach to perform interference cancellation, the signal processor may have improved likelihood of detecting and cancelling interference components corresponding to semi-correlated interference. It should be understood that, while a thresholding and zeroing approach is described, a MIN-of-MAX-based thresholding and attenuating approach may instead be used in one or more other embodiments in which, rather than applying zeroing masks to the spectrogram to remove interference components, an attenuating mask is instead applied that reduces the magnitudes of spectrogram cells determined to correspond to interference components.

In one or more embodiments, a global MAX-of-MIN-of-MAX thresholding technique may be applied by the processing circuitry (e.g., by a signal processor thereof) when performing interference cancellation. For example, a signal processor of the processing circuitry, during such an interference cancellation process, may be configured to compute a spectrogram by applying an STFT to input ("raw") ADC samples. These ADC samples may be obtained by first receiving signals that are reflected by one or more objects in the environment of the radar system using one or more receive (RX) antennas, then processing the received signals using receiver modules and ADC coupled to each RX antenna. The spectrogram may include a matrix of spectrogram samples, each spectrogram sample representing the magnitude of one or more received signal(s) at a particular time and frequency or a particular time bin and frequency bin. It should be understood that, while a thresholding and zeroing approach is described herein, a MAX-of-MIN-of-MAX-based thresholding and attenuating approach may instead be used in one or more other embodiments in which, rather than applying zeroing masks to the spectrogram to remove interference components, an attenuating mask is instead applied that reduces the magnitudes of spectrogram cells determined to correspond to interference components.

The signal processor may compute the absolute value (magnitude) of each spectrogram sample of the spectrogram to generate a matrix of spectrogram magnitudes. The signal processor may determine a first global threshold by determining a first MAX-of-MIN-of-MAX value for the matrix of spectrogram magnitudes by determining respective MIN-of-MAX values for each row of the matrix of spectrogram magnitudes, then determining a maximum value from among the determined MIN-of-MAX values, where the first global threshold is equal to the MAX-of-MIN-of-MAX value or the sum of the MAX-of-MIN-of-MAX and a predetermined offset (e.g., around 3 dB), in accordance with various embodiments. The signal processor may compare each cell of the matrix of spectrogram magnitudes to the first global threshold, and may set cells with values greater than the threshold to a first binary value (e.g., "0") and set cells with values less than or equal to the threshold to a second binary value (e.g., "1") to generate a first zeroing mask.

The signal processor may determine a second global threshold by applying a high pass filter (HPF) response to the matrix of spectrogram magnitudes to generate a weighted matrix of spectrogram magnitudes, then determining a second MAX-of-MIN-of-MAX value for the weighted matrix of spectrogram magnitudes. The signal processor may determine the second MAX-of-MIN-of-MAX by determining respective MIN-of-MAX values for each row of the weighted matrix of spectrogram magnitudes, then determining a maximum value from among the determined MIN-of-MAX values. The second global threshold may be set equal to the MAX-of-MIN-of-MAX value or the sum of the MAX-of-MIN-of-MAX and a predetermined offset (e.g., around 3 dB), in accordance with various embodiments. The signal processor may compare each cell of the weighted matrix of spectrogram magnitudes to the second global threshold, and may set cells with values greater than the threshold to a first binary value (e.g., "0") and set cells with values less than or equal to the threshold to a second binary value (e.g., "1") to generate a second zeroing mask.

The signal processor may generate an interference-suppressed spectrogram by applying the first zeroing mask and the second zeroing mask to the original spectrogram. The signal processor may compute an inverse STFT of the interference-suppressed spectrogram to generate interference-suppressed ADC samples. The signal processor may process the interference-suppressed ADC samples, such as by performing range compression, Doppler compression, peak detection, angle processing, target tracking, or other suitable radar processing steps based on the interference-suppressed ADC samples.

By using this global MAX-of-MIN-of-MAX-based thresholding and zeroing approach to interference cancellation, the signal processor may have improved likelihood of detecting and cancelling interference components corresponding to semi-correlated or highly correlated interference. Herein the term "highly correlated interference" is used to describe an interference whose chirp is similar to the victim radar's such that a large percentage of ADC samples (e.g. over 50%) are corrupted; the term "semi-correlated interference" is used to describe an interference whose chirp is somewhat similar to the victim radar's such that a noticeable percentage of ADC samples (e.g. 20% to 50%) are corrupted; and both terms are used in contrast to the term "uncorrelated interference", which is used to describe an interference whose chirp is dissimilar to the victim radar's such that a small percentage of ADC samples (e.g. less than 20%) are corrupted. For example, by generating and applying zeroing masks based on both the matrix of spectrogram magnitudes and the weighted (i.e., high-pass-filtered) matrix of spectrogram magnitudes, the signal processor may have a decreased probability of missing interference components during interference cancellation (e.g., at least because one zeroing mask may cover an interference component that is missed by the other zeroing mask). Further, computing and applying global thresholds when generating zeroing masks, rather than computing and applying thresholds on a row-by-row basis, may advantageously improve processing speed of the radar system when performing interference cancellation.

Interference cancellation processes described herein may be performed prior to performing range compression (e.g., performed by applying, by the signal processor, a fast-time Fast Fourier Transform (FFT) to the interference-suppressed ADC samples), doppler compression (e.g., performed by applying, by the signal processor, a slow-time Fast Fourier Transform (FFT) to the interference-suppressed and range-compressed ADC samples), peak detection, angle processing, and target tracking. In this way, the impact of interference on the ability of the radar system to accurately detect peaks and determine object locations and velocities may be advantageously mitigated.

Turning now to the figures, FIG. 1 shows a radar apparatus 100, as may be implemented in accordance with one or more embodiments. The apparatus 100 includes an antenna array 110, radar communication circuitry 120, and radar processing circuitry 130 (which may further interface with interface circuitry 140, for example automotive interface circuitry). The antenna array 110 includes a plurality of antennas, and the radar communication circuitry 120 includes transmission circuitry 122 and reception circuitry 124 (e.g., a plurality of transmitters and receivers). The radar processing circuitry 130 (e.g., radar MCPU) includes a controller module 132 and interference suppression and range construction circuitry 134.

These components of apparatus 100 may be operable to provide radar communications, in connection with signals communicated with the radar processing circuitry 130, utilizing interference suppression in the time-frequency domain and as may be implemented in accordance with one or more embodiments herein. For instance, positional characteristics of a target from which radar signals transmitted by the transmission circuitry 122 via the antenna array 110, and which are reflected from the target and received by the reception circuitry via the antenna array along with one or more interference signals, may be ascertained by interference suppression in accordance with one or more embodiments herein. In certain embodiments, the transmission circuitry 122 and reception circuitry 124 are respectively implemented in accordance with the transmitter and receiver circuitry as characterized in communication circuitry 220 in FIG. 2.

Figure 2:
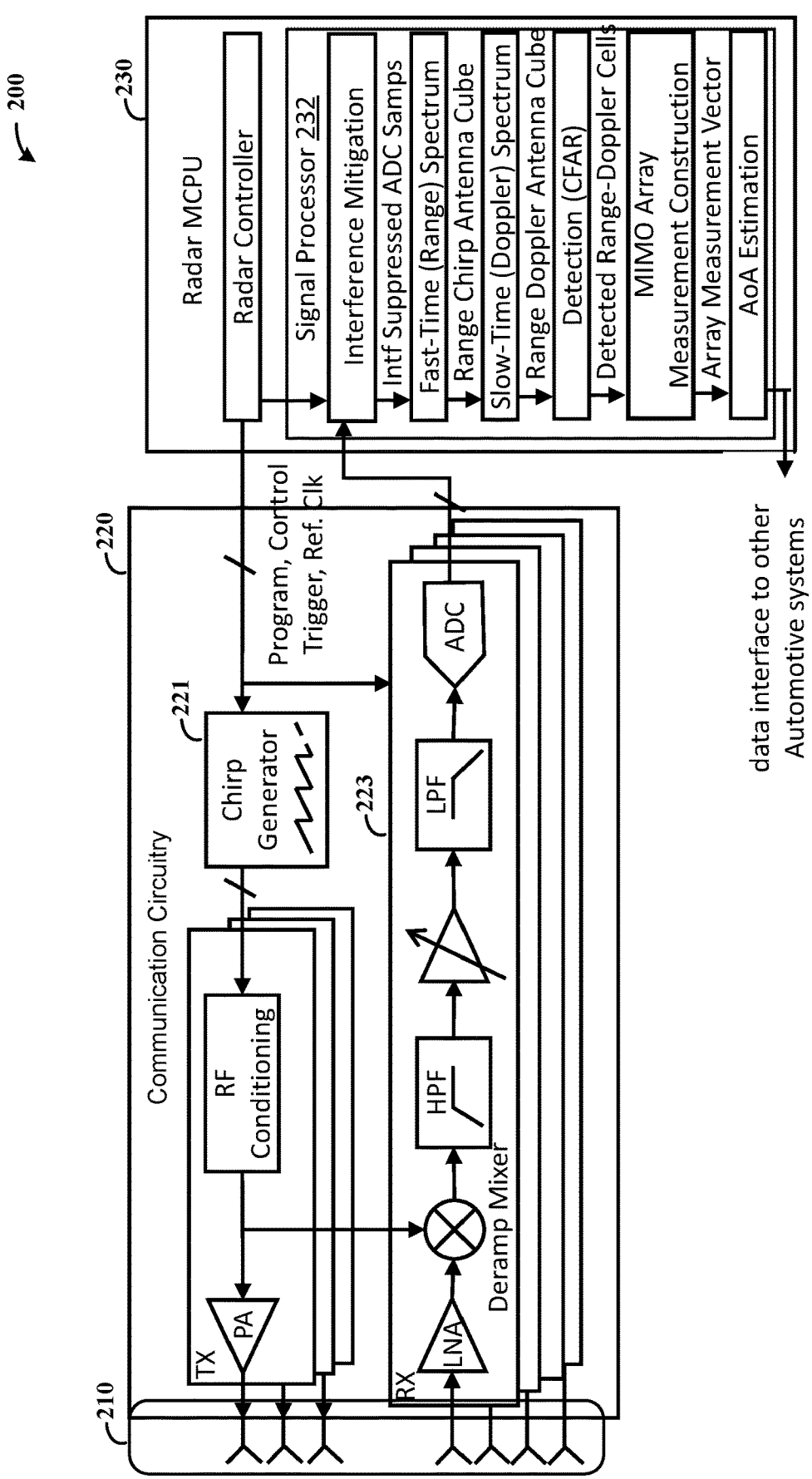
FIG. 2 shows a radar apparatus 200 with interference suppression, in accordance with the present disclosure.

FIG. 2 shows a radar apparatus 200 with interference suppression, as may be utilized for example with 76-81 GHz FMCW automotive radar systems. The apparatus 200 includes an antenna array 210, communication circuitry 220 and radar processing circuitry 230, and is operable to suppress interference utilizing aspects of received signals in the time-frequency domain. The communication circuitry 220 includes a plurality of transmitters and receivers (e.g., three transmitters and four receivers). The transmitters may include a chirp generator 221, and may include other transmission circuitry such as conditioning and amplifier circuits, and operate in response to radar control circuitry within the radar processing circuitry 230.

The receivers may include amplifier, filtering and other circuits as useful for receiving radar signals. For instance, each receiver may mix a return radar reflection with a transmitted chirp and filter the result to generate deramped IF (intermediate frequency) signals to be sampled by analog-to-digital converters (ADCs) and processed by a radar MCPU to mitigate interference via conversion of the ADC signals into the time-frequency domain and analysis therein to determine and implement a suppression threshold for removing interference, as characterized herein. The signals can then be converted back to provide interference-suppressed versions of the ADC signals, which are used to produce range and Doppler responses for each receiver channel. The range-Doppler response maps of the receivers from the transmitted signals may be aggregated to form a complete MIMO array measurement data cube consisting of range-Doppler response maps of antenna elements of a constructed MIMO virtual array. The range-Doppler responses may be non-coherently integrated and target detection may be attempted on the energy-combined range-Doppler map. A detection algorithm, such as may relate to variants of the CFAR algorithm, may be used to identify the range-Doppler cells in which targets may be present. For each detection cell, the array measurement vector may then be extracted and processed for identifying the incident angles of any target returns contained in the cell. The radar processing circuitry 230 may carry out angle estimation and target tracking, using the compensated output array vectors, for tracking positional characteristics of targets from which reflections are received. Such target information may further be provided via a data interface to external systems, such as automotive systems.

Figure 3:
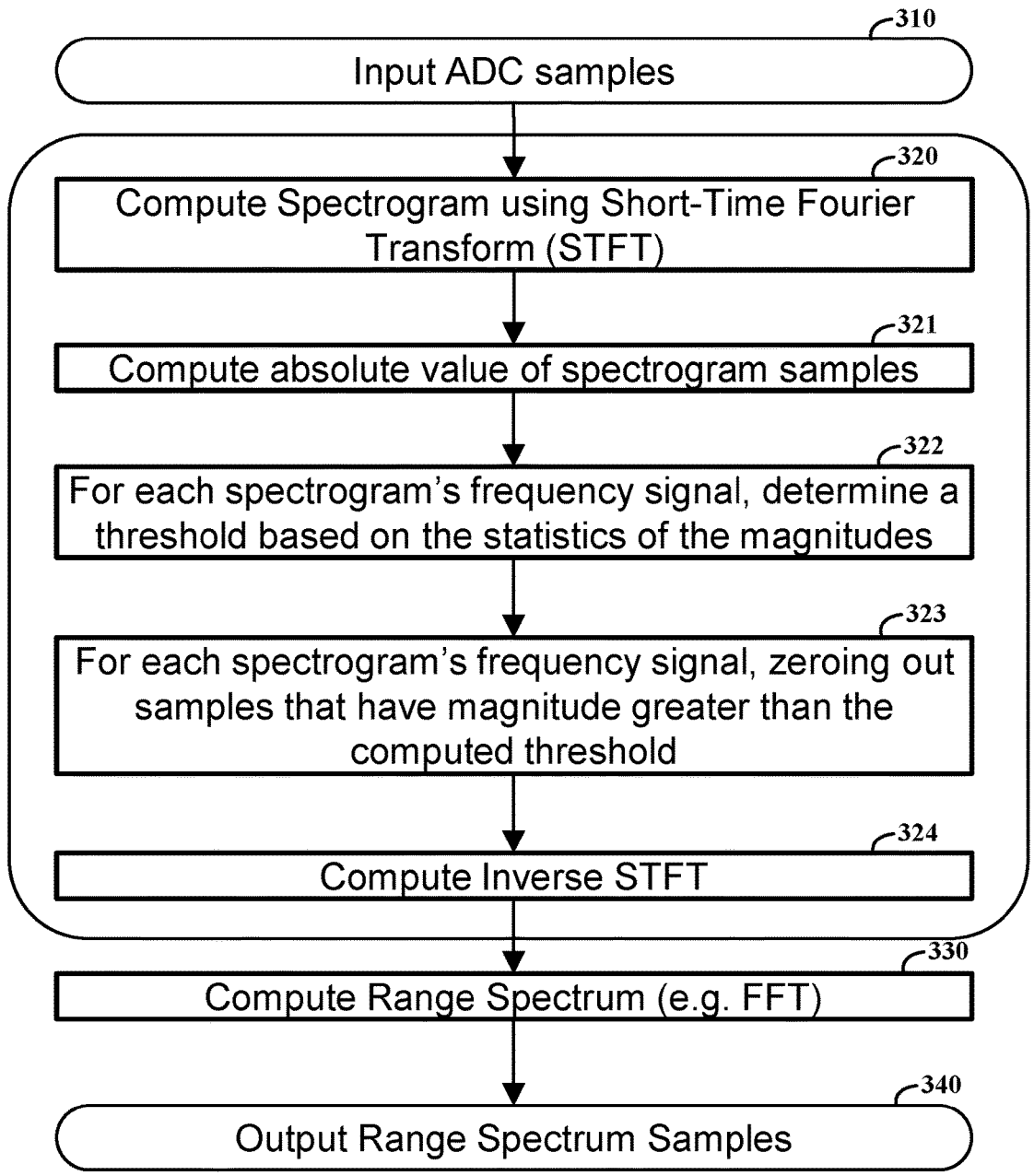
FIG. 3 shows a time-frequency-domain spectrogram thresholding and zeroing interference cancellation approach, in accordance with the present disclosure.

FIG. 3 shows a time-frequency-domain spectrogram thresholding and zeroing interference cancellation approach, in accordance with the present disclosure. Raw (unprocessed) ADC samples for each chirp and receiver are received at block 310 and processed to remove the interference components before the normal range FFT processing is carried out. Specifically, a spectrogram is computed using a STFT at block 320, such as may involve a series of shorter FFTs operated on windowed ADC samples.

Parameters including window size and stride size may be controlled for the STFT process. For an input length-N ADC sample vector such as $[x_1, x_2, \ldots, x_N]$, with an STFT window size W [samples] and a stride size S [samples], the k-th time-bin STFT output may be calculated based on the following equations. The FFT computation can be augmented by utilizing a standard tapering window to reduce sidelobes in the STFT spectrum.

$$X_{STFT} = \begin{bmatrix} X_{STFT,1} \\ X_{STFT,2} \\ \vdots \\ X_{STFT,K} \end{bmatrix}$$

$$X_{STFT,k} = FFT\{x_{STFT,k}\}(k = 1, 2, \ldots K)$$

$$x_{STFT,k} = [x_{1+(k-1)*S}, \ldots, x_{W+(k-1)*S}]$$

For each STFT frequency, the frequency signal's magnitudes (absolute values) are computed at block 321, and a histogram may be produced based on the magnitudes. A threshold is then computed at block 322 (e.g., based on the histogram). For instance, the threshold may be determined based on the peak count and the accumulative counts (sum of all counts from the lowest-value bin to the peak bin) at the peak bin.

$$TH = \text{Peak Bin Magnitude} +$$
$$\text{Bin Width} * \left(1 - \frac{\text{Accumulative Peak Bin Count} - \text{Peak Bin Count}}{\text{Peak Bin Count}}\right)$$

In another example, the threshold is determined based on a given percentile point. The approximate threshold value can be obtained by interpolating the cumulative histogram curve. More precise threshold values can be obtained by first identifying the histogram bin in which the percentile point resides in, sorting the members of the bin and interpolating on the sorted bin members. A second nominal-signal threshold may be used to prevent unnecessary zeroing of non-interference signals. The nominal signal threshold may be obtained from a link margin analysis for a given range, target RCS assumption, and may include STFT integration gain. In some instances, spectrogram components with magnitudes lower than this second nominal-signal threshold are not suppressed or zeroed to prevent undesirable removal of target signals. Because each frequency of the spectrogram maps to a section of range a target may reside in, and a target's magnitude reduces with range, different threshold values may be set for this second nominal-signal threshold with respect to different frequencies of the spectrogram.

Once the threshold is computed for a frequency signal (e.g., a row of the spectrogram), spectrogram samples with magnitudes greater than the threshold is set to zero at block 323. An example thresholding and zeroing result may involve checking each row of the spectrogram against a computed threshold value, and samples that have magnitudes greater than the threshold may be zeroed or nulled out, or attenuated in general.

Once the interference components of the spectrogram are zeroed, the spectrogram may be converted back to time-domain ADC samples at block 324, by reversing the STFT process using inverse STFT. If $\check{X}_{STFT,k}$ is denoted as the k-th row of the spectrogram matrix after the thresholding and zeroing process is completed, the inverse STFT may compute the k-th short-time window signal using the following equation. If a tapering window is applied in the forward STFT process, an inverse tapering window may be used to recover the time domain samples with correct amplitudes.

$$\check{x}_k = IFFT\{\check{X}_{STFT,k}\} = [\check{x}_{k,1+(k-1)*S}, \ldots, \check{x}_{k,W+(k-1)*S}]$$

The process may be repeated for each row of the interference-suppressed spectrogram to obtain a short-time window signal. The final ADC sample stream may be reconstructed from these overlapped short-time window signals by taking the mean of the multiple values for each ADC sample position. When the stride equals the window length, there is no overlap and the reconstructed ADC sample stream may be the concatenated version of the IFFT outputs.

At block 330, the ADC samples can be processed to compute a range spectrum (e.g., using FFT), and range spectrum samples may be output at block 340. In some implementations, the process of STFT, thresholding and zeroing, inverse STFT, and then computing the range spectrum using FFT may be streamlined by computing a zero-padded STFT to the length of the range spectrum output length, conducting thresholding and zeroing, and then summing the interference-suppressed STFT short-time spectrums over the short-time. The zero-padded STFT may involve computing FFT of the windowed ADC samples of length W which are zero-padded to length N before applying the FFT.

Referring again to block 330, spectral estimation techniques such as Sparse Bayesian Learning and Bayesian Linear Regression with Cauchy Prior may be used to address sidelobes. In connection with this approach, it has been recognized/discovered that transforming ADC samples into the time-frequency domain for interfered-sample detection and removal can provide interference suppression while maintaining desirable signal properties, such as low SNR. It has further been recognized/discovered that the use of an inverse STFT to reconstruct an interference-suppressed ADC sample stream for subsequent processing provides useful processing in interference-laden environments.

Figure 4:
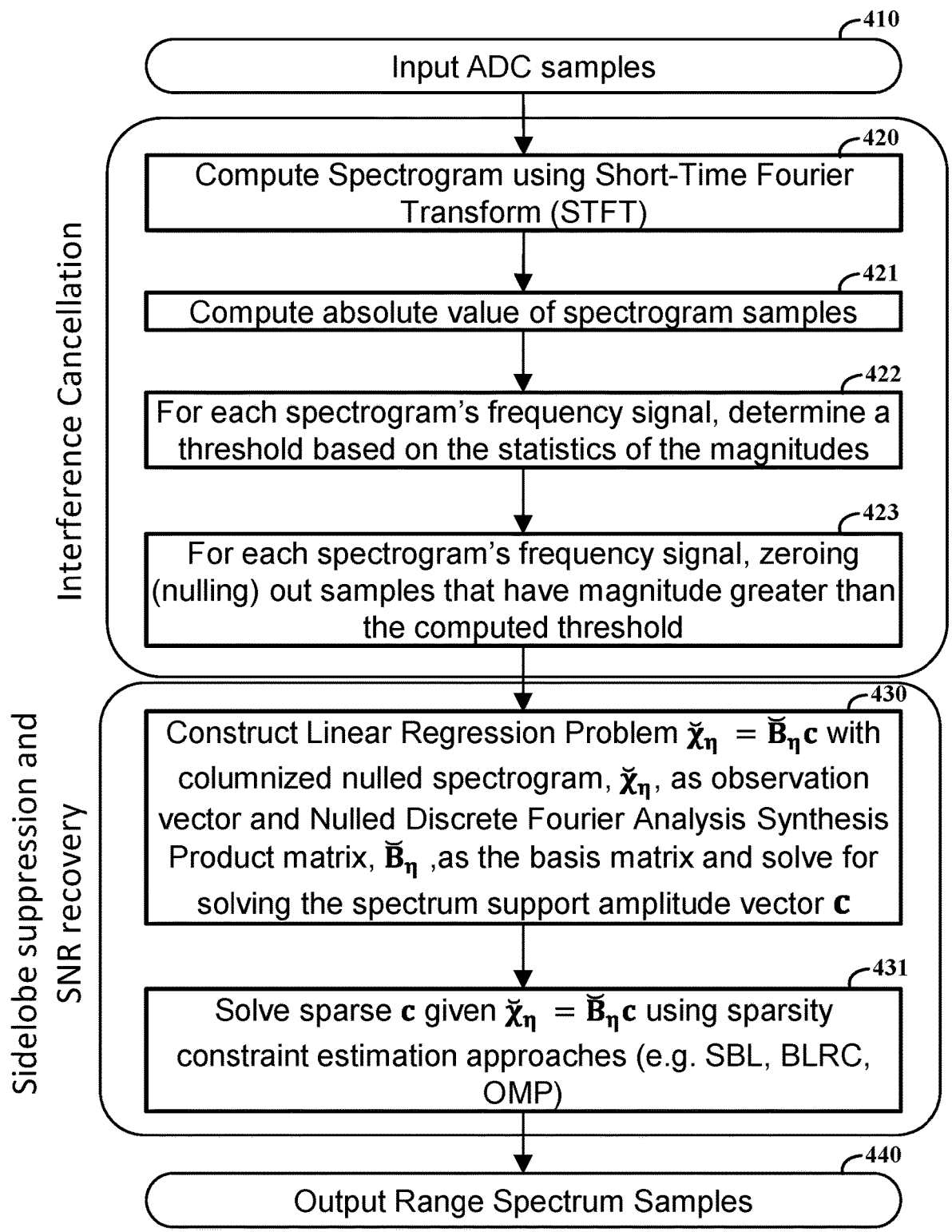
FIG. 4 shows an ADC sample processing flow, as may be implemented with a sparse linear regression approach in accordance with the present disclosure.

FIG. 4 shows an ADC sample processing flow, as may be implemented with a sparse linear regression approach for interference suppression. This may be carried out, for example, to implement nulled-spectrogram sparse linear regression, involving time-frequency domain thresholding and zeroing, as may be used for suppressing interference and reconstructing a range spectrum (with interference suppression), and with the capability of retaining SNR and suppressing ambiguous sidelobes.

At block 410, ADC samples are received and thereafter processed to effect interference cancellation. A spectrogram is computed using a STFT at block 420, such as may involve a series of shorter FFTs operated on windowed ADC samples. For each STFT frequency, the frequency signal's magnitudes (absolute values) are computed at block 421. A threshold is then computed at block 422 based on statistics of the magnitudes. Once the threshold is computed for each frequency signal, spectrogram samples with magnitudes greater than the threshold is set to zero at block 423. This interference cancellation may, for example, be carried out in a manner similar to that discussed in connection with FIG. 3.

Sidelobe suppression and SNR recovery are carried out at blocks 430 and 431, in which a linear regression problem is constructed at block 430 and sparse solution solving carried out at block 431. At block 440, range spectrum samples are output.

More specifically, processing may be carried out for an ADC sample vector x where $x=[x_1, x_2, \ldots, x_N]^T$ and a windowed version of x is $\check{x}_k$ where $\check{x}_k=[\check{X}_{k,1}, \check{X}_{k,2}, \ldots, \check{X}_{k,w}]^T=[x_{1+(k-1)*s}, \ldots, x_{w+(k-1)*s}]^T$ where W is the STFT's window size in [samples] and S is a STFT sliding window's stride in [samples]. The k-th window's STFT, $\check{X}_k$ where $\check{X}_k=[\check{X}_k=\check{X}_{k,1}, \check{X}_{k,2}, \ldots, \check{X}_{k,w}]^T$ is computed using the following equation, which computes $\check{X}_{k,m}$, may be denoted as the m-th element of the k-th STFT output vector.

$$\check{X}k, j = \sum_{i=1}^{W} x_{i+(k-1)*S} e^{-j2\pi\frac{(i-1)(j-1)}{W}} = \sum_{i=1}^{W} \check{x}_{k,i} e^{-i2\pi\frac{(i-1)(j-1)}{W}}$$

$j = 1, 2, \ldots, W$(index for the elements of a *STFT* output vector)

$k = 1, 2, \ldots, L$(index for *STFT* windows)

Following the definition of a Discrete Fourier Transform (DFT), the above can be written in matrix-vector form as the equation below, where $D_w$ is a W×W square DFT matrix evaluated on a W-point uniform frequency grid.

$$\check{X}_k = \begin{bmatrix} \check{X}_{k,1} \\ \check{X}_{k,2} \\ \vdots \\ \check{X}_{k,W} \end{bmatrix} =$$

$$\begin{bmatrix} e^{-j2\pi\frac{(1-1)(1-1)}{W}} & e^{-j2\pi\frac{(2-1)(1-1)}{W}} & e^{-j2\pi\frac{(3-1)(1-1)}{W}} & & e^{-j2\pi\frac{(W-1)(1-1)}{W}} \\ e^{-j2\pi\frac{(1-1)(2-1)}{W}} & e^{-j2\pi\frac{(2-1)(2-1)}{W}} & e^{-j2\pi\frac{(3-1)(2-1)}{W}} & & e^{-j2\pi\frac{(W-1)(2-1)}{W}} \\ e^{-j2\pi\frac{(1-1)(3-1)}{W}} & e^{-j2\pi\frac{(2-1)(3-1)}{W}} & e^{-j2\pi\frac{(3-1)(3-1)}{W}} & \cdots & e^{-j2\pi\frac{(W-1)(3-1)}{W}} \\ \vdots & \vdots & \vdots & & \vdots \\ e^{-j2\pi\frac{(1-1)(W-1)}{W}} & e^{-j2\pi\frac{(2-1)(W-1)}{W}} & e^{-j2\pi\frac{(3-1)(W-1)}{W}} & & e^{-j2\pi\frac{(W-1)(W-1)}{W}} \end{bmatrix}$$

$$\begin{bmatrix} \check{x}_{k,1} \\ \check{x}_{k,2} \\ \vdots \\ \check{x}_{k,W} \end{bmatrix} \equiv D_w \check{x}_k$$

The full STFT matrix can be columnized and represented as the following equation, where 0 is a W×W square matrix of zeros.

$$\check{X} = \begin{bmatrix} \check{X}_1 \\ \check{X}_2 \\ \vdots \\ \check{X}_L \end{bmatrix} = \begin{bmatrix} \begin{bmatrix} \check{X}_{1,1} \\ \check{X}_{1,1} \\ \vdots \\ \check{X}_{1,W} \end{bmatrix} \\ \begin{bmatrix} \check{X}_{2,1} \\ \check{X}_{2,1} \\ \vdots \\ \check{X}_{2,W} \end{bmatrix} \\ \vdots \\ \begin{bmatrix} \check{X}_{L,1} \\ \check{X}_{L,1} \\ \vdots \\ \check{X}_{L,W} \end{bmatrix} \end{bmatrix} = \begin{bmatrix} D_W & 0 & & 0 \\ 0 & D_W & \cdots & 0 \\ \vdots & \vdots & & \vdots \\ 0 & 0 & & D_W \end{bmatrix} \begin{bmatrix} \check{x}_1 \\ \check{x}_2 \\ \vdots \\ \check{x}_L \end{bmatrix}$$

The expression of the ADC samples of each STFT window may be converted into a Fourier Synthesis form, that is a matrix of columns of steering vector, Å times a support amplitude vector, c. This is model is consistent with the actual signal composition because, by definition, the ADC sample vector is made up of flat sinusoidal tones. An i-th ADC sample of a k-th window may be modelled using the following equation.

$$\check{x}_{k,i} = \sum_{m=1}^{M} c_m e^{j2\pi\frac{(m-1)(i-1+(k-1)*S)}{M}}$$

$i = 1, 2 \ldots, W$(index for *ADC* samples in a *STFT* window)

$m = 1, 2 \ldots, M$(index for suports of the range spectrum output)

With the above equation, the windowed ADC samples can be expressed as a discrete Fourier synthesis signal using the following equations and an expression of the columnized spectrogram can be obtained as a product of a discrete Fourier analysis (i.e. DFT) matrix (Ď), discrete Fourier synthesis (i.e. inverse DFT) matrix (Å), and the spectrum support amplitude vector (c).

$$\check{x}_k = \begin{bmatrix} \check{x}_{k,1} \\ \check{x}_{k,2} \\ \vdots \\ \check{x}_{k,W} \end{bmatrix} =$$

$$\begin{bmatrix} e^{j2\pi\frac{(1-1)(1-1+(k-1)*S)}{M}} & e^{j2\pi\frac{(2-1)(1-1+(k-1)*S)}{M}} & e^{j2\pi\frac{(3-1)(1-1+(k-1)*S)}{M}} & & e^{j2\pi\frac{(M-1)(1-1+(k-1)*S)}{M}} \\ e^{j2\pi\frac{(1-1)(2-1+(k-1)*S)}{M}} & e^{j2\pi\frac{(2-1)(2-1+(k-1)*S)}{M}} & e^{j2\pi\frac{(3-1)(2-1+(k-1)*S)}{M}} & & e^{j2\pi\frac{(M-1)(2-1+(k-1)*S)}{M}} \\ e^{j2\pi\frac{(1-1)(3-1+(k-1)*S)}{M}} & e^{j2\pi\frac{(2-1)(3-1+(k-1)*S)}{M}} & e^{j2\pi\frac{(3-1)(3-1+(k-1)*S)}{M}} & \cdots & e^{j2\pi\frac{(M-1)(3-1+(k-1)*S)}{M}} \\ \vdots & \vdots & \vdots & & \vdots \\ e^{j2\pi\frac{(1-1)(W-1+(k-1)*S)}{M}} & e^{j2\pi\frac{(2-1)(W-1+(k-1)*S)}{M}} & e^{j2\pi\frac{(3-1)(W-1+(k-1)*S)}{M}} & & e^{j2\pi\frac{(M-1)(M-1+(k-1)*S)}{M}} \end{bmatrix} \begin{bmatrix} c_1 \\ c_2 \\ \vdots \\ c_M \end{bmatrix} =$$

$$\frac{1}{M}\begin{bmatrix} 1 & e^{j2\pi\frac{(k-1)*S}{M}} & e^{j2\pi\frac{2(k-1)*S}{M}} & & e^{j2\pi\frac{(M-1)(k-1)*S}{M}} \\ 1 & e^{j2\pi\frac{(1+(k-1)*S)}{M}} & e^{j2\pi\frac{2(+(k-1)*S)}{M}} & & e^{j2\pi\frac{(M-1)(1+(k-1)*S)}{M}} \\ 1 & e^{j2\pi\frac{(2+(k-1)*S)}{M}} & e^{j2\pi\frac{2(2+(k-1)*S)}{M}} & \ldots & e^{j2\pi\frac{(M-1)(2+(k-1)*S)}{M}} \\ \vdots & \vdots & \vdots & & \vdots \\ 1 & e^{j2\pi\frac{(W-1+(k-1)*S)}{M}} & e^{j2\pi\frac{2(W-1+(k-1)*S)}{M}} & & e^{j2\pi\frac{(M-1)(W-1+(k-1)*S)}{M}} \end{bmatrix} \begin{bmatrix} c_1 \\ c_2 \\ \vdots \\ c_M \end{bmatrix} = \check{A}_k c$$

$$\check{x} = \begin{bmatrix} \check{x}_1 \\ \check{x}_2 \\ \vdots \\ \check{x}_L \end{bmatrix} = \begin{bmatrix} \check{A}_1 \\ \check{A}_2 \\ \vdots \\ \check{A}_L \end{bmatrix} c = \check{A}c$$

$$\check{X} = \check{D}\check{x} = \check{D}\check{A}c = \check{B}c$$

With above equation, the range spectrum support amplitude vector (c, to be estimated) can be related to the columnized spectrogram, $\check{X}$ by a product with a newly constructed basis matrix $\check{B}$ (which is the product of the DFT) matrix ($\check{D}$) and the discrete Fourier synthesis (e.g., inverse DFT) matrix ($\check{A}$).

Many of the spectrogram elements may be nulled out in the thresholding and zeroing step, so many elements in the $\check{X}$ vector are zeros. As a result, the corresponding rows in $\check{B}$ have no effect on the equation and as such, these elements of $\check{X}$ and corresponding rows of $\check{B}$ can be deleted from the equation. Denote $\eta$ as the set of indices pointing to the elements of $\check{X}$ that are not zeroed. The equation may be rewritten as follows, where $\check{X}_\eta$ is $\check{X}$ with the zeroed elements removed and $\check{B}_\eta$ is $\check{B}$ with columns corresponding to the zeroed element removed.

$$\check{X}_\eta = \check{B}_\eta c$$

The target range spectrum may reconstructed using a linear regression problem of solving c given the nulled-out columnized spectrogram $\check{X}_\eta$ and nulled-out new (DFT-IDFT product) basis matrix $\check{B}_\eta$. Utilizing the sparse range spectrum, to solve c, sparsity constraints may be used to improve the quality of the result. Sparsity constraint solvers such as Matching Pursuit (MP), Orthogonal Matching Pursuit (OMP), and others can be used. Robust results can be obtained by using Bayesian Linear Regression approaches, such as Sparse Bayesian Learning (SBL) and Bayesian Linear Regression with Cauchy Prior (BLRC), among other solvers.

In connection with one or more aspects of the disclosure, it has been recognized/discovered that relating the solving of sparse c to observed spectrogram of ADC samples, $\check{X}$ (instead of ADC samples directly) can provide beneficial radar signal processing, and the further deletion of interference infested elements of $\check{X}$ and rows of $\check{B}$ has a positive effect on the solving of the sparse solution of c.

Figure 5:
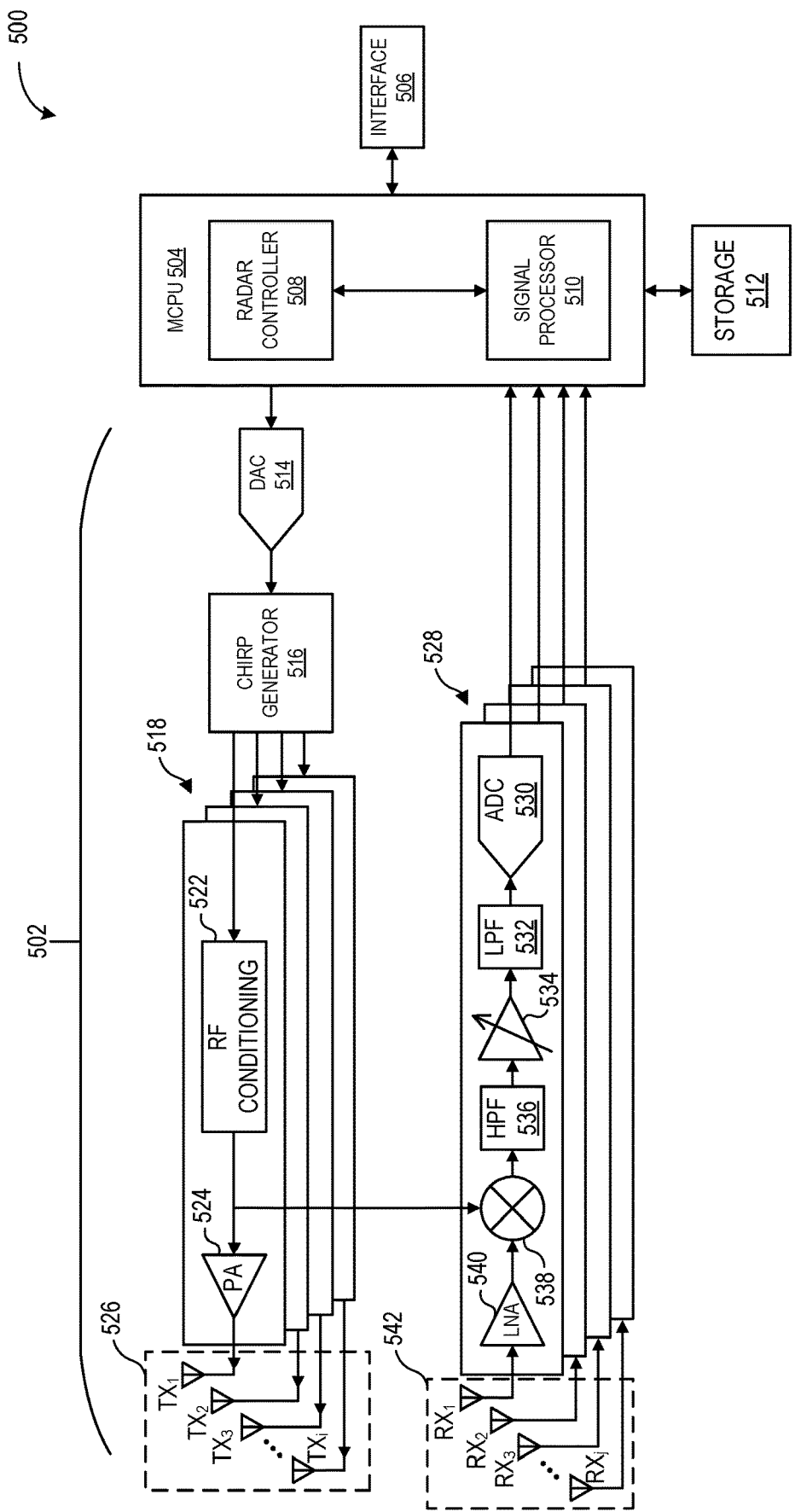
FIG. 5 shows a radar system that may be configured to perform interference cancellation, in accordance with various embodiments.

FIG. 5 shows an illustrative diagram of a radar system 500 which includes a radar device 502 connected to a radar microcontroller and processing unit (MCPU) 504, which may be configured to perform interference cancellation prior to range and Doppler compression in accordance with various embodiments. In one or more embodiments, the radar system 500 may be a Multiple-Input Multiple-Output (MIMO) radar system, such as a LFM MIMO radar system. In one or more embodiments, the radar device 502 may be embodied as a line-replaceable unit (LRU) or modular component that is designed to be replaced quickly at an operating location. Similarly, the radar MCPU 504 may be embodied as a line-replaceable unit (LRU) or modular component. Although a single or mono-static radar device 502 is shown, it will be appreciated that additional distributed radar devices may be used to form a distributed or multi-static radar. In addition, the depicted radar system 500 may be implemented in integrated circuit form with the radar device 502 and the radar MCPU 504 formed with separate integrated circuits (chips) or with a single chip, depending on the application.

The radar device 502 includes one or more transmitting antenna elements 526 (sometimes referred to herein as "transmit antennas 526") and receiving antenna elements 542 (sometimes referred to herein as "receive antennas 542") connected, respectively, to one or more radio-frequency (RF) transmitter (TX) modules 518 and receiver (RX) modules 528. Each transmit antenna 526 and TX module may be associated with a respective transmit channel of a group of transmit channels designated herein as TX1, TX2, TX3, . . . TXi, where "i" is the total number of transmit (TX) channels. Each receive antenna 542 and RX module 528 may be associated with a respective receive channel of a group of receive channels designated herein as RX1, RX2, RX3, . . . RXj, where "j" is the number of receive (RX) channels. As a non-limiting example, a radar device (e.g., the radar device 502) can include individual antenna elements (e.g., antenna elements 526) connected, respectively, to four transmitter modules (e.g., the transmitter modules 518) and sixteen receiver modules (e.g., the receiver modules 528). These quantities of transmitter and receiver antenna elements and modules are intended to be illustrative and not limiting, with other quantities of these elements being possible in one or more other embodiments, such as four transmitter modules 518 and six receiver modules 528, or a single transmitter module 518 and/or a single receiver module 528. The radar device 502 includes a chirp generator 516, which is configured to supply chirp input signals to the transmitter modules 518. To this end, the chirp generator 516 is configured to receive input program and control signals, including, as non-limiting examples, a reference local oscillator (LO) signal, a chirp start trigger signal, and program control signals, from the MCPU 504 via a digital-to-analog converter (DAC) 514. The chirp generator 516 is configured to generate chirp signals and send the chirp signals to the transmitter modules 518 for transmission via the transmitting antenna elements 526. Each transmitter module 518 includes a RF conditioning module 522 that is configured to filter the phase-coded chirp signals. Each transmitter module 518 includes a power amplifier 524 configured to amplify the filtered, phase-coded chirp signal before they are provided to and transmitted via one or more corresponding transmitting antenna elements 526. Herein, a transmitted chirp signal is sometimes referred to as a "transmit signal".

The radar signal transmitted by the transmitter antenna modules 518 may be reflected by an object in an environment of the radar device 502, and part of the reflected radar signal, sometimes referred to herein as a "return signal" or a "reflection", is received by the receiver antenna modules 528 at the radar device 502. At each receiver module 528, the received (radio frequency) antenna signal is amplified by a low noise amplifier (LNA) 540 and then fed to a mixer 538 where it is mixed with the transmitted chirp signal generated by the RF conditioning module 522. The resulting intermediate frequency signal is fed to a high-pass filter (HPF) 536. The resulting filtered signal is fed to a variable gain amplifier 534, which amplifies the signal before feeding it to a low pass filter (LPF) 532. This re-filtered signal is fed to an analog/digital converter (ADC) 530 and is output by each receiver module 528 (e.g., output to the signal processor 510 of the MCPU 504) as a digital signal. In this way, the receiver modules 528 compress the target echo of various delays into multiple sinusoidal tones whose frequencies correspond to the round-trip delay of the echo.

In the radar system 500, the radar MCPU 504 may be connected and configured to supply input control signals to the radar device 502 and to receive therefrom digital output signals generated by the receiver modules 528. In one or more embodiments, the radar MCPU 504 includes a radar controller 508 and a signal processor 510, where either or both of which may be embodied as a microcontroller unit or other processing unit. The radar controller 508 can receive data from the radar device 502 (e.g., from the receiver modules 528) and can control radar parameters of the radar device 502, such as frequency band, length of each radar frame, and the like via the DAC 514. For example, the DAC 514 may be used to adjust the radar chirp signals output from the chirp generator 516 included in the radar device 502. The signal processor 510 may be configured and arranged for signal processing tasks such as, but not limited to, target object identification, interference cancellation, computation of the distance or range to a target object, computation of the radial velocity of a target object, and computation of the AoA of signals reflected by a target object, and the like. Herein, the term "AoA" or "Angle-of-Arrival" refers to the angle of a reflected signal (e.g., a radar signal) incident on an antenna array. The signal processor 510 can provide calculated values associated with such computations to a storage 512 and/or to other systems via an interface 506.

The interface 506 can enable the MCPU 504 to communicate with other systems over local and wide area networks, the internet, automotive communication buses, and/or other kinds of wired or wireless communication systems, as non-limiting examples. In one or more embodiments, the MCPU 504 can provide the calculated values over the interface 506 to other systems, such as a radar-camera-lidar fusion system; an automated driving assistance system including parking, braking, or lane-change assistance features; and the like. The storage 512 can be used to store instructions for the MCPU 504, received data from the radar device 502, calculated values from the signal processor 510, and the like. Storage 512 can be any suitable storage medium, such as a volatile or non-volatile memory.

To control the transmitter modules 518, the radar controller 508 may, for example, be configured to generate transmitter input signals, such as program, control trigger, reference LO signal(s), calibration signals, frequency spectrum shaping signals (such as ramp generation in the case of FMCW radar). The radar controller may, for example, be configured to receive data signals, sensor signals, and/or register programming or state machine signals for RF (radio frequency) circuit enablement sequences.

At each receiver module 528, digital output signals are generated from target return signals for digital processing by the signal processor 510 to construct and accumulate multiple-input multiple-output (MIMO) array vector outputs forming a MIMO aperture for use in computing plots or maps for AoA estimation and target object tracks. In particular, in the signal processor 510, the digital output signals may undergo an interference cancellation process before being processed by one or more fast Fourier transform (FFT) modules or Discrete Fourier Transform (DFT) modules, such as a fast-time (range) FFT module which generates a range chirp antenna cube (RCAC) and a slow-time (Doppler) FFT module which generates a range-Doppler antenna cube (e.g., including range-Doppler response maps for each RX antenna). The signal processor 510 may perform Constant False Alarm Rate (CFAR) detection on the range-Doppler antenna cube to detect peaks. The signal processor 510 may further process the range-Doppler antenna cube based on the detected peaks to construct a MIMO array vector which the signal processor 510 then processes to perform AoA estimation and target object tracking. The MCPU 504 may then output the resulting target tracks (e.g., via the interface 506) to other automotive computing or user interfacing devices for further processing or display.

Figure 6:
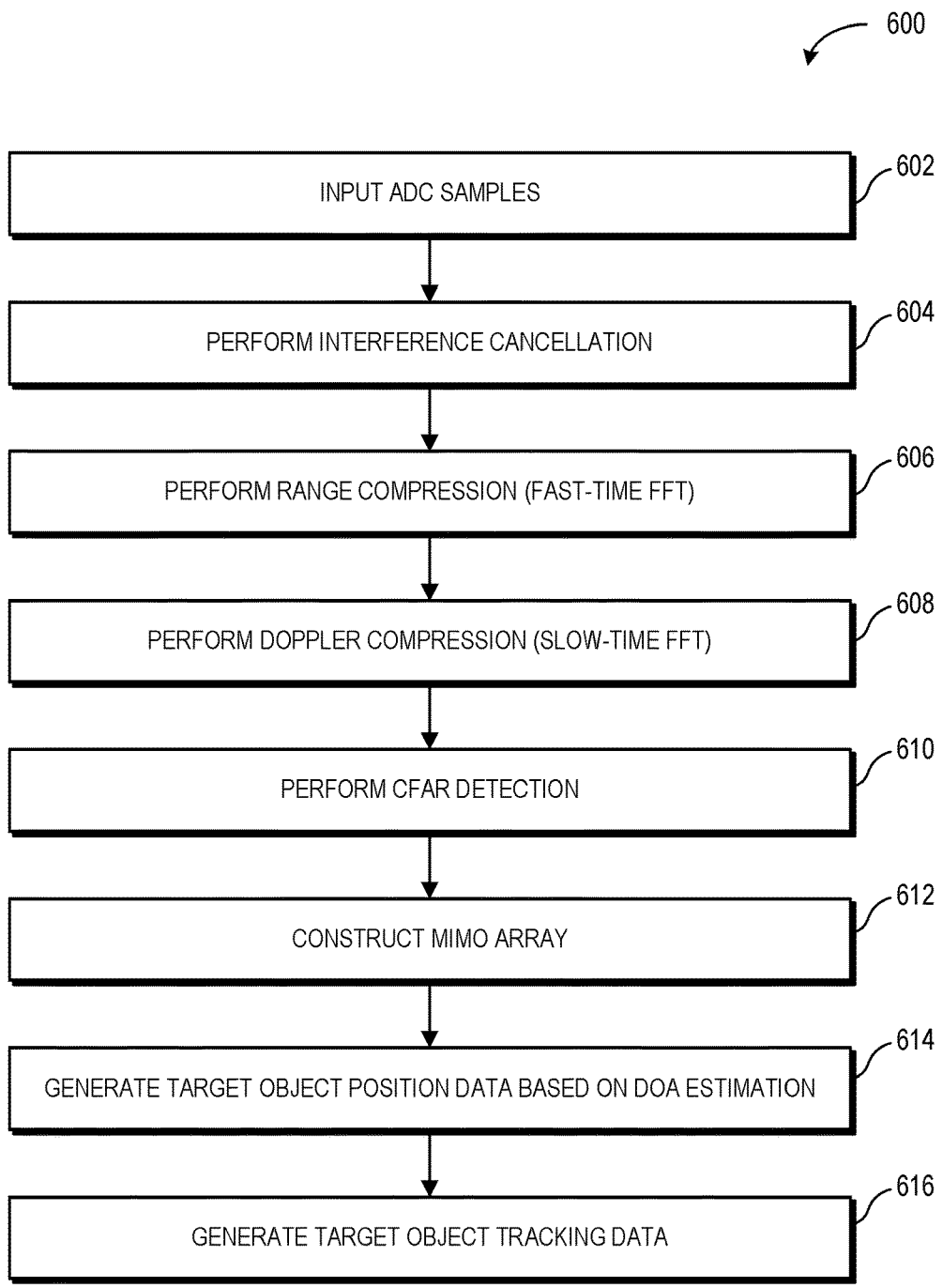
FIG. 6 shows an illustrative process flow for a method of radar signal processing that includes interference cancellation, in accordance with various embodiments.

FIG. 6 shows an illustrative process flow for a method 600 by which raw data corresponding to sampled return signals corresponding to reflections of transmitted signals that are reflected by one or more target objects in an environment around a MIMO radar system. The method 600 may be performed using either or both of a radar controller and signal processor of a radar MCPU, in accordance with one or more embodiments. The method 600 is described with reference to elements of the radar system 500 of FIG. 5. However, it should be understood that this is illustrative and not limiting, at least in that other suitable radar systems may be used to carry out the method 600 in one or more other embodiments.

At block 602, the signal processor 510 of the MCPU 504 of the radar system 500 receives raw sample data (sometimes referred to as "ADC samples) from one or more ADCs 530 of the receiver modules 528. These ADC samples may be output by the ADCs 530 as digital signals. These ADC samples represent received signals (sometimes referred to as "reflected signals" or "return signals") corresponding to reflections of transmit signals (e.g., chirps) transmitted by the transmitter modules 518 via the transmit antenna elements 526, where the transmit signals are reflected off of one or more target objects in the environment of the radar system 500. The return signals are received by the receiver modules 528 via the receive antenna elements 542.

At block 604, the signal processor 510 performs interference cancellation to remove interference components from the raw ADC data. In one or more embodiments, the interference cancellation performed by the signal processor 510 may include performing an STFT on the raw ADC data to produce a spectrogram, generating an interference-suppressed spectrogram by identifying and removing interference components in the spectrogram using at least one thresholding and attenuating or zeroing approach in conjunction with a matrix of spectrogram magnitudes, and performing an inverse STFT (e.g., "iSTFT") to produce interference-suppressed ADC samples. Examples of how the signal processor 510 may perform interference cancellation are described in more detail below in connection with FIGS. 7 and 10.

At block 606, the signal processor 510 performs range compression of the raw ADC samples by performing a fast-time FFT or DFT on the raw ADC samples, for example. The signal processor 510 may generate a range chirp antenna cube (RCAC) as an output of this fast-time FFT or DFT.

At block 608, the signal processor 510 performs Doppler compression of the RCAC by performing a slow-time FFT or DFT on the RCAC, for example. The signal processor 510 may generate a range-Doppler antenna cube as an output of this slow-time FFT or DFT. The range-Doppler antenna cube may be a three-dimensional array having dimensions m×n×p, where m represents the number of Doppler bins, n represents the number of range bins, and p represents the number of RX channels (e.g., corresponding to the number of receive antenna elements 542 or the number of receiver modules 528) represented in the range-Doppler antenna cube. Each element of the range-Doppler antenna cube may encode complex amplitude of a received signal for a particular range bin, Doppler bin, and RX channel.

In the range-Doppler antenna cube, each range bin represents ranges or distances between the radar system and a target object. Each Doppler bin represents Doppler shift values corresponding to velocities at which a target object may be traveling (e.g., relative to the ego velocity of the radar system). Such velocities may be calculated based on the determined Doppler shift associated with the target object.

At block 610, the signal processor 510 performs CFAR detection to determine the location of peaks (i.e., "detected peaks") in the range-Doppler antenna cube. While the signal processor 510 is described as using CFAR detection in the present example, it should be understood that this is intended to be illustrative and not limiting, such that other suitable peak detection approaches may be used in one or more other embodiments.

At block 612, the signal processor 510 constructs a virtual MIMO array based on the range-Doppler antenna cube and the detected peaks.

At block 614, the signal processor 510 generates target object position data based, at least in part, on AoA estimation performed using the virtual MIMO array.

At block 616, signal processor 510 generates target object tracking data based on the target object position data.

Figure 7:
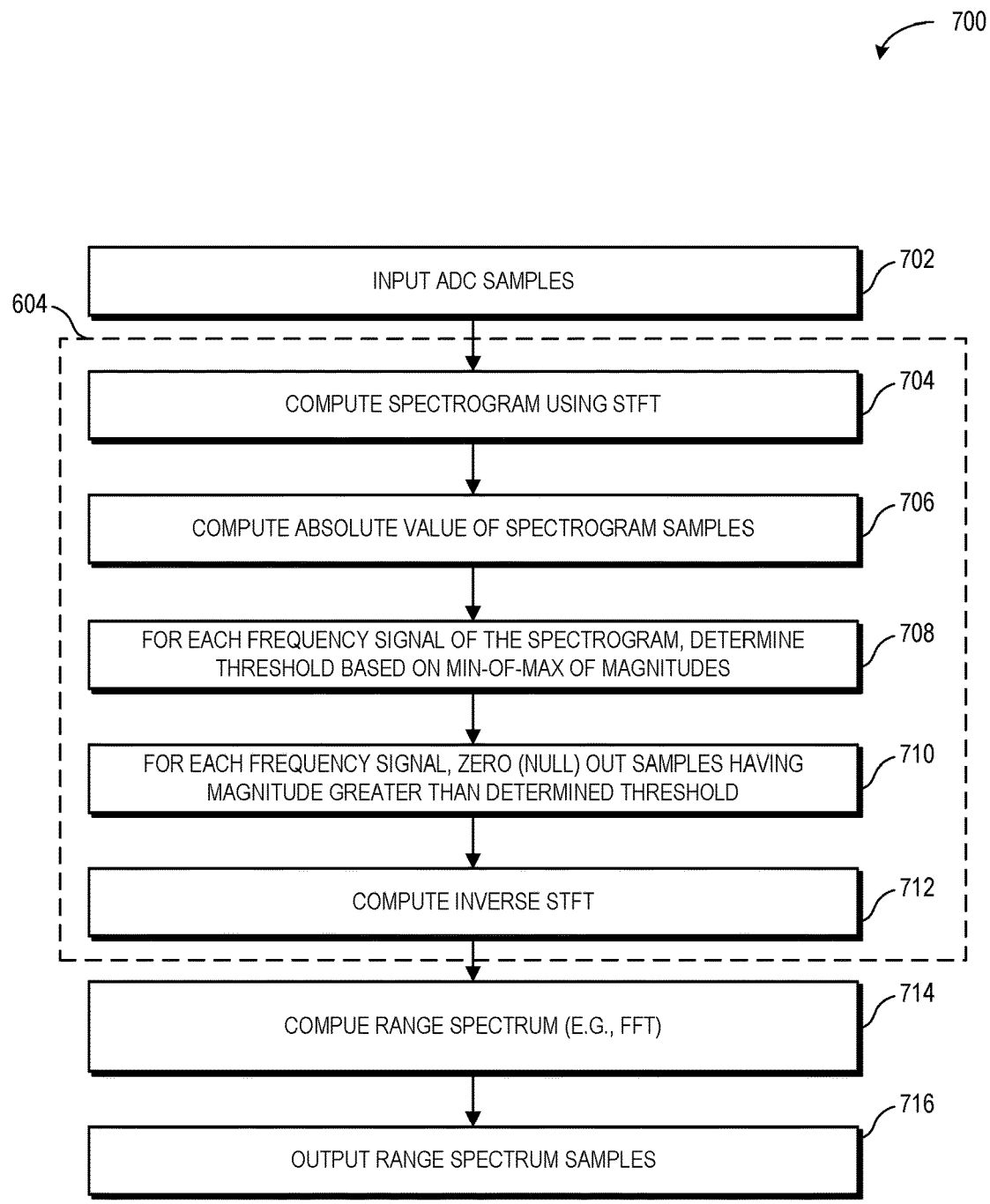
FIG. 7 shows an illustrative process flow for a method of interference cancellation that includes time-frequency-domain spectrogram thresholding and zeroing based on a local (per-frequency) MIN-of-MAX approach, in accordance with various embodiments.

FIG. 7 shows an illustrative process flow for a method 700 by which a signal processor of a radar system may use a time-frequency-domain spectrogram thresholding and attenuation or zeroing interference cancellation approach to remove or suppress interference that may be present in raw ADC samples reflected radar signals. For example, the method 700 may be performed by the radar apparatus 200 of FIG. 2, the radar system 500 of FIG. 5, or any other suitable radar apparatus or system.

At block 702, the signal processor receives raw ADC samples from one or more ADCs (e.g., ADCs 530 of FIG. 5), each coupled to respective receiver modules and RX antennas (e.g., receiver modules 528 and RX antennas 542 of FIG. 5). Each ADC sample may represent a reflection of a respective chirp transmitted by transmitter circuitry (e.g., transmitter modules 518 and TX antennas 526 of FIG. 5) of the radar system, where the chirp is reflected by one or more objects in the environment of the radar system. In addition to information from reflected chirp signals, one or more of the ADC samples may include interference from other signals in the environment, such as radar signals transmitted by other radar systems.

After receiving the raw ADC samples at block 702, the signal processor may perform interference cancellation process at blocks 704, 706, 708, 710, and 712. This interference cancellation process may correspond to the interference cancellation process performed at block 604 of the method 600 of FIG. 6, in accordance with one or more embodiments.

At block 704, the signal processor computes a spectrogram by applying a STFT to the raw ADC samples. The computation of the spectrogram at block 704 may be similar to the computation of the spectrogram at block 320 of Figure, described above, and details of the computation are not repeated here for sake of brevity.

At block 706, the signal processor computes the absolute value (i.e., magnitude) of each of the spectrogram samples of the spectrogram computed at block 704. Herein, "spectrogram samples" of a spectrogram are sometimes referred to as "cells" of the spectrogram.

For example, the signal processor may generate a matrix of spectrogram magnitudes, with each cell of the matrix of spectrogram magnitudes having a cell value equal to the magnitude of a corresponding cell of the spectrogram.

At block 708, the signal processor determines a respective threshold for each frequency signal of the matrix of spectrogram magnitudes (i.e., for each row of the matrix of spectrogram magnitudes) based on a respective MIN-of-MAX magnitude determined by the signal processor for that frequency signal. In one or more embodiments, for each row of the matrix of spectrogram magnitudes, the signal processor may determine a threshold TH that is calculated as TH=MIN-of-MAX+Y, where Y is a predetermined offset (e.g., around 3 dB). It should be noted here the spectrogram can be arranged into either row-based frequency signals (i.e. each row corresponds to a frequency) or column-based frequency signals (i.e. each column corresponds to a frequency). Here the row-based convention is used without losing generality.

The signal processor may determine the MIN-of-MAX value for a given row of the matrix of spectrogram magnitudes by dividing cells of the row into groups of predetermined size, determining the maximum value of each group of cells, then determining the minimum value from among the determined maximum values, where this minimum value is the MIN-of-MAX value.

Figure 8:
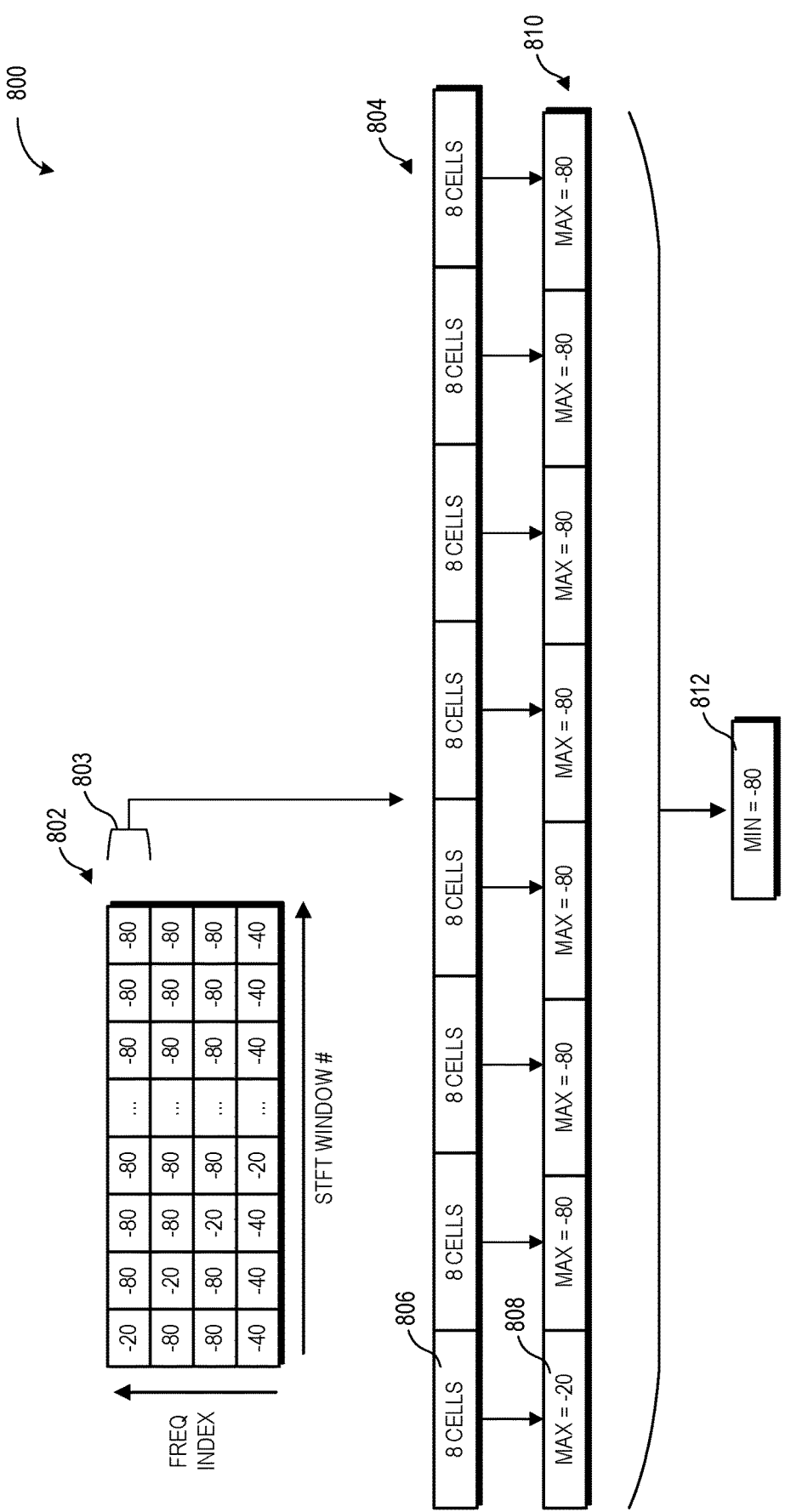
FIG. 8 shows a process for determining the MIN-of-MAX value for a row of spectrogram magnitudes, in accordance with various embodiments.

FIG. 8 shows a diagram illustrating a process 800 for determining a MIN-of-MAX value for a row 803 of a matrix 802 (e.g., as part of the block 708 of the method 700 of FIG. 7, as a non-limiting example). The matrix 802 may be a matrix spectrogram magnitudes (e.g., computed at block 706 of FIG. 7), with rows representing frequency indices and columns representing STFT window numbers. Values in the present example are given in decibels (dB).

For example, a signal processor, such as the signal processor 510 of FIG. 5, may extract the row 803 from the matrix 802 and may logically divide the row 803 into groups 804, with each group, such as the group 806, including 8 cells of the row 803. In the present example, the row 803 includes 64 cells, though it should be understood that this is intended to be illustrative and not limiting. More or fewer cells may be included in each group in accordance with one or more other embodiments.

The signal processor calculates maximum cell values in each of the groups 804 to generate maxima 810. In the present example, the maximum 808 represents the greatest cell value (i.e., −20 dB) of the group 806, and, similarly, other maxima of the maxima 810 represent the greatest cell values of corresponding groups of the groups 804. The signal processor then determines a minimum 812 by calculating the minimum value from among the maxima 810. In the present example, the minimum value is −80. The minimum 812 represents the MIN-of-MAX value for the row 803.

Returning to FIG. 7, at block 710, the signal processor, for each row of the spectrogram (i.e., the spectrogram computed at block 704), replaces all cells of that row having cell values greater than the threshold for that row (determined at block 708) with zeroes (i.e., "zeroing out" or "nulling" those cells). In one or more embodiments, the signal processor may identify cells of the spectrogram having cell values greater than the corresponding, row-dependent threshold as including or likely including interference components. The signal processor may then generate a mask in which cells at cell indices corresponding to those of spectrogram cells having cell values greater than the corresponding, row-dependent threshold are set to a first binary value (e.g., 0) and all other cells of the mask are set to a second binary value (e.g., 1), and apply (e.g., via element-wise or "dot" product) the map to the original spectrogram to zero out or "null" cells of the spectrogram that include or that are likely to include an interference component. The result of applying of a zeroing mask to a spectrogram by a signal processor to remove interference components may be referred to herein as an "interference-suppressed spectrogram."

In one or more embodiments, the matrix of spectrogram magnitudes may have horizontal symmetry about a row or pair of rows, such that the signal processor may only be required to calculate MIN-of-MAX values for half of the rows of the matrix of spectrogram magnitudes to determine thresholds for the matrix of spectrogram magnitudes.

At block 712, the signal processor computes an iSTFT of the interference-suppressed spectrogram to produce interference-suppressed ADC samples.

At block 714, the signal processor computes a range spectrum by applying an FFT (e.g., fast-time FFT) to the interference-suppressed ADC samples, then outputs the range spectrum samples at block 716. The blocks 714 and 716 may, together, correspond to the block 606 of the method 600 of FIG. 6, as a non-limiting example.

By using the MIN-of-MAX-based thresholding and zeroing approach of the method 700 to perform interference cancellation the signal processor may have improved likelihood of detecting and cancelling interference components corresponding to any of uncorrelated interference, semi-correlated interference, or highly correlated interference. Additionally, the MIN-of-MAX-based thresholding and zeroing approach may be more computationally efficient and more accurate than conventional interference mitigation techniques that perform thresholding solely based on magnitude statistics.

Figure 9:
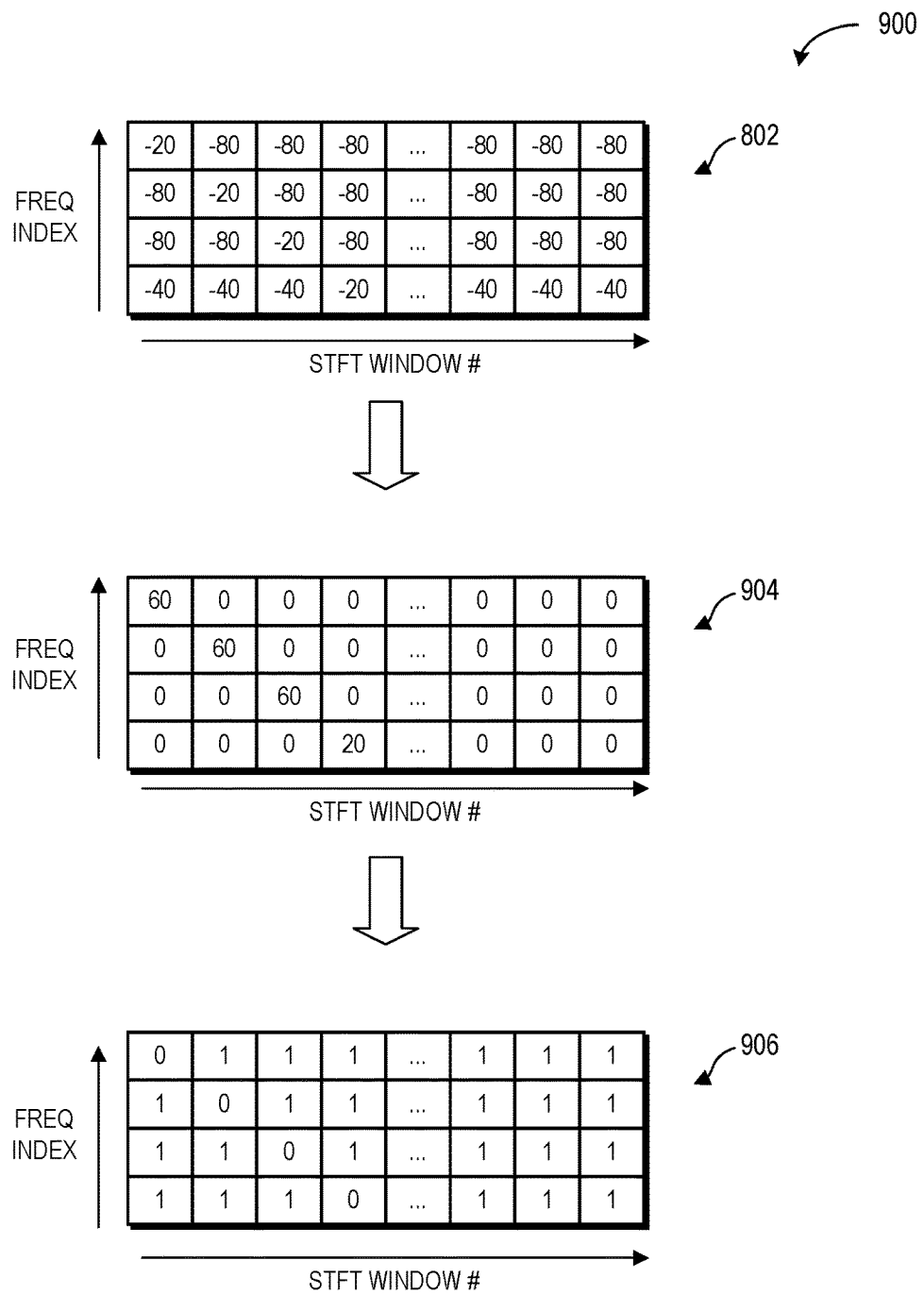
FIG. 9 shows a sequence of matrices that may be generated when computing a zeroing mask as part of a time-frequency-domain spectrogram thresholding and zeroing interference cancellation process based on a local (per-frequency) MIN-of-MAX approach, in accordance with various embodiments.

FIG. 9 shows matrices 900 that may be generated as part of an interference suppression or interference cancellation process performed by a signal processor of a radar system, such as the radar apparatus 200 of FIG. 2 or the radar system 500 of FIG. 5, as non-limiting examples. One or more elements in the present example may be similar to corresponding elements of FIG. 8, and like reference numerals refer to like elements. Some aspects of such elements that have already been described are not repeated here for sake of brevity.

The matrices 900 may include a matrix 802, a matrix 904, and a matrix 906. The signal processor may generate the matrix 802 (e.g., at blocks 704 and 706 of the method 700 of FIG. 7) by computing a spectrogram (e.g., using a STFT) based on raw ADC signals representing reflected signals received via one or more sets of receiver circuitry (e.g., with each set including at least one RX antenna, a receiver module, and an ADC) then computing the respective magnitudes of each cell of the spectrogram to generate a matrix of spectrogram magnitudes. The signal processor may determine the MIN-of-MAX of each row of the matrix 802 (e.g., at block 708 of FIG. 7), and may subtract the MIN-of-MAX for each row from each cell in that row to generate the matrix 904. The signal processor may then generate the matrix 906 by comparing the cell value of each cell of the matrix 904 to a threshold (e.g., around 3 dB). The signal processor may set any cell of the matrix 904 having a value exceeding the threshold to a first binary value (e.g., 0) and set any cell of the matrix 904 having a value less than or equal to the threshold a second binary value (e.g., 1) to generate the matrix 906. The signal processor may apply the matrix 906 as a mask (sometimes referred to herein as a "zeroing mask") to a spectrogram from which the matrix 802 was derived (e.g., using an element-wise product or "dot" product) to remove interference components (i.e., cells affected by interference), thereby producing an interference-suppressed spectrogram. The signal processor may then convert the interference-suppressed spectrogram back to the time domain using an iSTFT (e.g., at block 712 of FIG. 7) to produce interference-suppressed ADC signals.

The generation of the matrix 904 in the present example is intended to be illustrative and not limiting. In one or more other embodiments, for example, the signal processor may perform a threshold comparison for each cell of the matrix 802 using a row-dependent threshold of TH=MIN-of-MAX+Y, where Y is a predetermined offset (e.g., around 3 dB), and MIN-of-MAX being the MIN-of-MAX value for the particular row to which the threshold is being applied. The signal processor may then generate the matrix 906 by setting any cell of the matrix 802 having a value exceeding its corresponding row threshold to a first binary value (e.g., 0) and setting any cell of the matrix 802 having a value less than or equal to its corresponding threshold to a second binary value (e.g., 1). In one or more such embodiments, the generation of the matrix 904 may be omitted.

Figure 10:
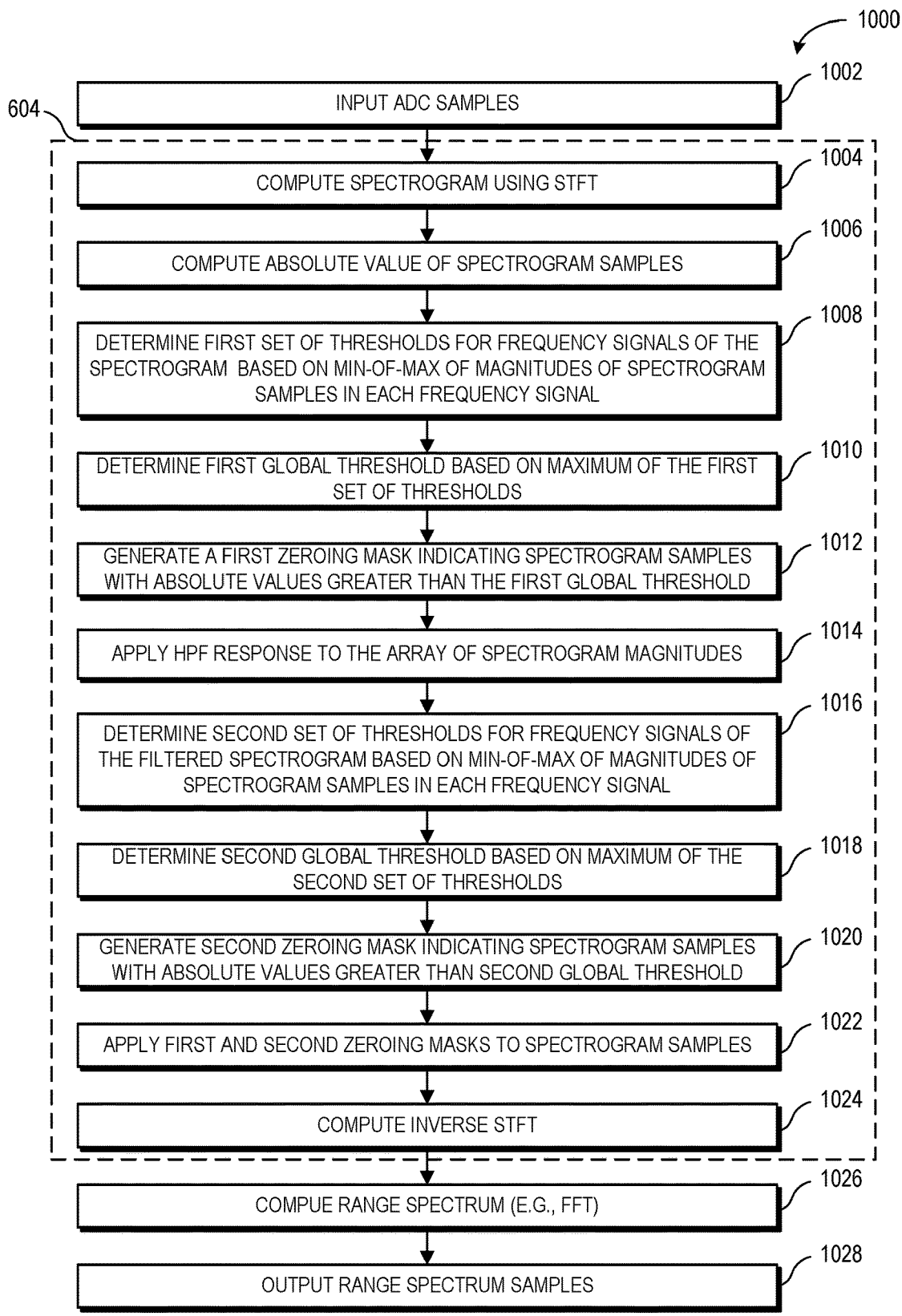
FIG. 10 shows an illustrative process flow for a method of interference cancellation that includes time-frequency-domain spectrogram thresholding and zeroing based on a global MAX-of-MIN-of-MAX approach, in accordance with various embodiments.

FIG. 10 shows an illustrative process flow for a method 1000 by which a signal processor of a radar system may use a time-frequency-domain spectrogram global thresholding and zeroing interference cancellation approach to remove or suppress interference that may be present in raw ADC samples reflected radar signals. For example, the method 1000 may be performed by the radar apparatus 200 of FIG. 2, the radar system 500 of FIG. 5, or any other suitable radar apparatus or system.

At block 1002, the signal processor receives raw ADC samples from one or more ADCs (e.g., ADCs 530 of FIG. 5), each coupled to respective receiver modules and RX antennas (e.g., receiver modules 528 and RX antennas 542 of FIG. 5). Each ADC sample may represent a reflection of a respective chirp transmitted by transmitter circuitry (e.g., transmitter modules 518 and TX antennas 526 of FIG. 5) of the radar system, where the chirp is reflected by one or more objects in the environment of the radar system. In addition to information from reflected chirp signals, one or more of the ADC samples may include interference from other signals in the environment, such as radar signals transmitted by other radar systems.

After receiving the raw ADC samples at block 1002, the signal processor may perform interference cancellation process at blocks 1004, 1006, 1008, 1010, 1012, 1014, 1016,

1018, 1020, 1022, and 1024. This interference cancellation process may correspond to the interference cancellation process performed at block 604 of the method 600 of FIG. 6, in accordance with one or more embodiments.

At block 1004, the signal processor computes a spectrogram by applying a STFT to the raw ADC samples. The computation of the spectrogram at block 1004 may be similar to the computation of the spectrogram at block 320 of FIG. 3, described above, and details of the computation are not repeated here for sake of brevity.

At block 1006, the signal processor computes the absolute value (i.e., magnitude) of each of the spectrogram samples of the spectrogram computed at block 1004. For example, the signal processor may generate a matrix of spectrogram magnitudes, with each cell of the matrix of spectrogram magnitudes having a cell value equal to the magnitude of a corresponding cell of the spectrogram.

At block 1006, the signal processor determines a first set of local thresholds for the frequency signals of the matrix of spectrogram magnitudes (i.e., such that a respective threshold is determined for each row of the matrix of spectrogram magnitudes). Here the term "local" is used to indicate that the threshold is applicable to its corresponding frequency signal. The signal processor determines a threshold (i.e., of the first set of local thresholds) for a given frequency signal (i.e., a given row of the matrix of spectrogram magnitudes) based on a corresponding MIN-of-MAX value determined by the signal processor for the given frequency signal. In one or more embodiments, for each row of the matrix of spectrogram magnitudes, the signal processor may determine a local threshold TH that is calculated as TH=MIN-of-MAX+Y, where Y is a predetermined offset (e.g., around 3 dB).

The signal processor may determine the MIN-of-MAX value for a given row of the matrix of spectrogram magnitudes by dividing cells of the row into groups of predetermined size, determining the maximum value of each group of cells, then determining the minimum value from among the determined maximum values, where this minimum value is the MIN-of-MAX value (e.g., in a manner similar to that described above in connection with the process 800 of FIG. 8).

At block 1010, the signal processor determines a first global threshold based on the maximum of the first set of local thresholds. Because this maximum is the maximum of the MIN-of-MAX values, the maximum may be referred to herein as a MAX-of-MIN-of-MAX value of the matrix of spectrogram magnitudes.

Figure 11:
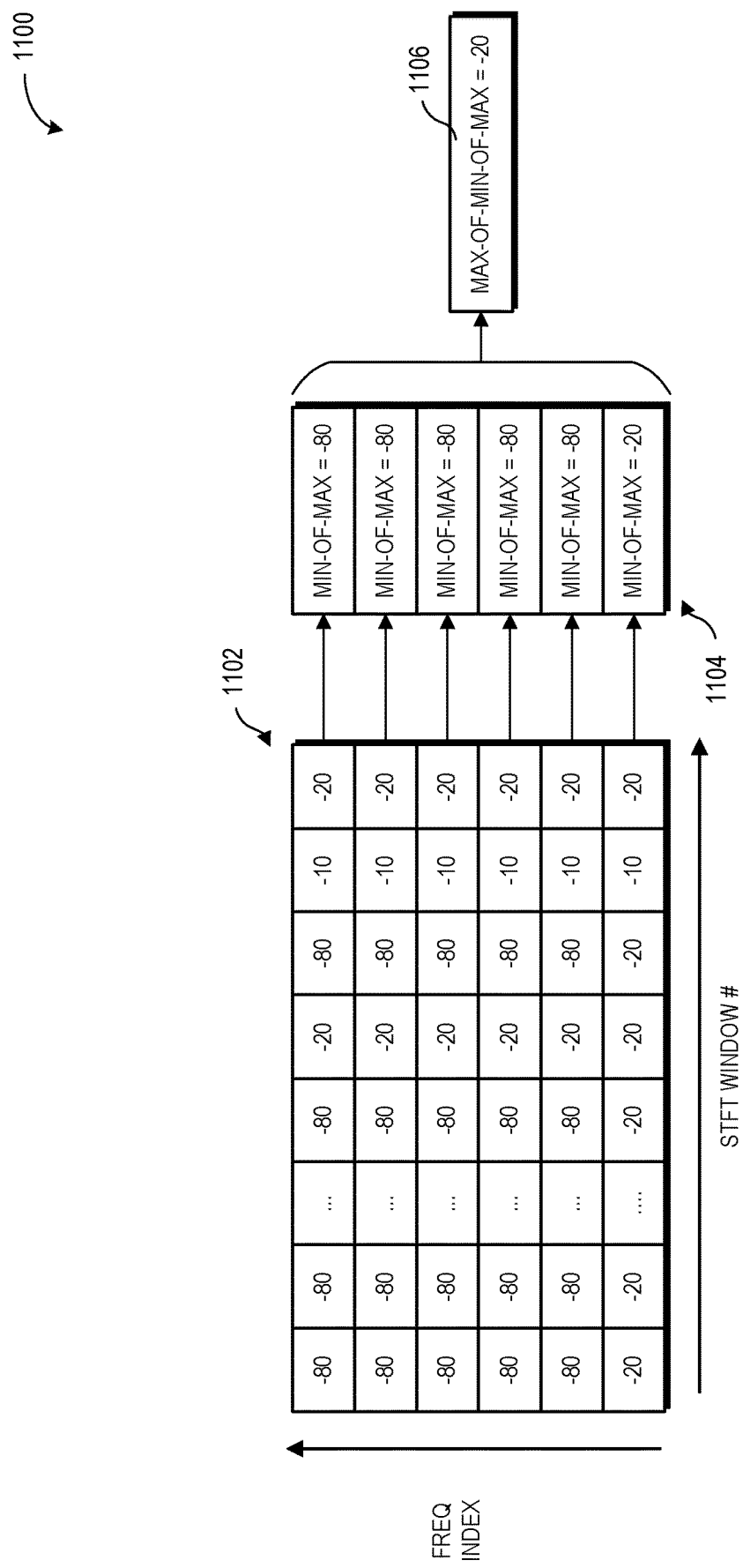
FIG. 11 shows a process for determining the MAX-of-MIN-of-MAX value for a matrix of spectrogram magnitudes, in accordance with various embodiments.

FIG. 11 shows a diagram illustrating a process 1100 for calculating a global threshold by determining a MAX-of-MIN-of-MAX value for a matrix 1102. The matrix 1102 may be a matrix of spectrogram magnitudes (e.g., computed at block 1006 of FIG. 10). In one or more embodiments, the process 1100 may be performed a signal processor of a radar apparatus or system, such as the signal processor 232 of FIG. 2 or the signal processor 510 of FIG. 5, as non-limiting examples. Values in the present example are given in decibels (dB).

When calculating the global threshold, the signal processor calculates the MIN-of-MAX values 1104 for each row of the matrix 1102 (e.g., in a manner similar to that described above in connection with the process 800 of FIG. 8). The signal processor then determines the MAX-of-MIN-of-MAX value 1106 (shown here to be −20 dB) by determining the maximum value from among the MIN-of-MAX values 1104. The signal processor may then use the MAX-of-MIN-of-MAX value 1106 as a global threshold in one or more subsequent processing steps, in accordance with one or more embodiments. In one or more embodiments, the signal processor may add an offset, Y, (e.g., around 3 dB) to the MAX-of-MIN-of-MAX value 1106 to set the global threshold.

Returning to FIG. 10, at block 1012, the signal processor generates a first zeroing mask indicating spectrogram samples with absolute values (magnitudes) greater than the first global threshold. For example, the signal processor may generate the first zeroing mask as a matrix of binary values. Cells of the first zeroing mask at indices corresponding spectrogram samples with magnitudes exceeding the first global threshold may be set to a first binary value (e.g., 0) by the signal processor. Cells of the first zeroing mask at indices corresponding spectrogram samples with magnitudes less than or equal to the first global threshold may be set to a second binary value (e.g., 1) by the signal processor.

At block 1014, the signal processor applies a high pass filter (HPF) response to each column of the matrix of spectrogram magnitudes to generate a weighted matrix of spectrogram magnitudes. For example, the HPF response may be applied in the form of a finite impulse response (FIR) filter by calculating the element-wise sum of a one-dimensional (1D) array of FIR weights with that column, where the signal processor populates columns of the weighted matrix of spectrogram magnitudes from the results of these sums. In one or more embodiments, as a non-limiting example, the HPF response may have a transfer function $H(z)$:

$$H(z)=0.0115-0.562z^{-1}-0.1314z^{-2}-0.2052z^{-3}+0.7623z^{-4}-0.2052z^{-5}-0.1314z^{-6}-0.562z^{-7}+0.0115z^{-8}.$$

In one or more embodiments, the array of FIR weights may be given as [−100, −50, −38, −31, −27, −23, −20, −17, −15, −13, −12, −10, −9, −8, −7, −6, −5, −4, −4, −3, −3, −2, −2, −1, −1, −1, −1, −1, 0, 0, 0, 0, . . . , 0], as an illustrative, non-limiting example. The size (i.e., number of elements) of the array of FIR weights may be equal to the size of a given column of the matrix of spectrogram magnitudes.

At block 1016, the signal processor determines a second set of local thresholds for the frequency signals of the weighted matrix of spectrogram magnitudes (i.e., such that a respective threshold is determined for each row of matrix of spectrogram magnitudes). The signal processor determines a threshold (i.e., of the second set of local thresholds) for a given frequency signal (i.e., a given row of the weighted matrix of spectrogram magnitudes) based on a corresponding MIN-of-MAX value determined by the signal processor for the given frequency signal. In one or more embodiments, for each row of the weighted matrix of spectrogram magnitudes, the signal processor may determine a local threshold TH that is calculated as TH=MIN-of-MAX+Y, where Y is a predetermined offset (e.g., around 3 dB).

The signal processor may determine the MIN-of-MAX value for a given row of the weighted matrix of spectrogram magnitudes by dividing cells of the row into groups of predetermined size, determining the maximum value of each group of cells, then determining the minimum value from among the determined maximum values, where this minimum value is the MIN-of-MAX value (e.g., in a manner similar to that described above in connection with the process 800 of FIG. 8).

At block 1018, the signal processor determines a second global threshold based on the maximum of the second set of local thresholds. Because this maximum is the maximum of the MIN-of-MAX values, the maximum may be referred to herein as a MAX-of-MIN-of-MAX value of the matrix of weighted spectrogram magnitudes.

At block 1020, the signal processor generates a second zeroing mask indicating spectrogram samples with absolute values (magnitudes) greater than the second global threshold. For example, the signal processor may generate the second zeroing mask as a matrix of binary values. Cells of the second zeroing mask at indices corresponding spectrogram samples with magnitudes exceeding the second global threshold may be set to a first binary value (e.g., 0) by the signal processor. Cells of the second zeroing mask at indices corresponding spectrogram samples with magnitudes less than or equal to the second global threshold may be set to a second binary value (e.g., 1) by the signal processor.

At block 1022 the signal processor, applies the first and second zeroing masks to the spectrogram (i.e., the spectrogram computed at block 1004) to generate an interference-suppressed spectrogram. By applying the first and second zeroing masks to the spectrogram, the signal processor replaces all cells of the spectrogram having cell values greater than either of the first global threshold or the second global threshold with zeroes (i.e., "zeroing out" or "nulling" those cells). In one or more embodiments, the first zeroing mask and the second zeroing mask may be applied to the spectrogram sequentially, with the signal processor computing a first element-wise product (i.e., "dot product") of the first zeroing mask and the spectrogram, then computing a second element-wise product of the second zeroing mask and the result of the first element-wise product to generate the interference-suppressed spectrogram. In one or more other embodiments, the signal processor may apply the first zeroing mask and the second zeroing mask by computing a first element-wise product of the first zeroing mask and the second zeroing mask to generate a combined zeroing mask, then computing a second element-wise product of the combined zeroing mask and the spectrogram to generate the interference-suppressed spectrogram. Note that in all the descriptions before and after, it should be understood that the zeroing or nulling operation can be replaced with attenuation operation for suppressing the interference. For example, when attenuating a cell of the spectrogram, rather than zeroing the signal, the magnitude of that cell may be reduced by a dynamic or predetermined amount.

At block 1024, the signal processor computes an iSTFT of the interference-suppressed spectrogram to produce interference-suppressed ADC samples.

At block 1026, the signal processor computes a range spectrum by applying an FFT (e.g., fast-time FFT) to the interference-suppressed ADC samples, then outputs the range spectrum samples at block 1028. The blocks 1026 and 1028 may, together, correspond to the block 606 of the method 600 of FIG. 6, as a non-limiting example.

By using the global MAX-of-MIN-of-MAX-based thresholding and zeroing approach of the method 1000 to perform interference cancellation, the signal processor may have improved likelihood of detecting and cancelling interference components corresponding to semi-correlated or highly correlated interference. Compared to the MIN-of-MAX-based thresholding and zeroing approach described above, the global MAX-of-MIN-of-MAX-based thresholding and zeroing approach of the method 1000 may have improved performance, for example, in situations where traffic is highly congested, such that many sources of interference are present in received radar signals. For example, by generating and applying zeroing masks based on both the matrix of spectrogram magnitudes and the weighted (i.e., high-pass-filtered) matrix of spectrogram magnitudes, the signal processor may have a decreased probability of missing interference components during interference cancellation (e.g., at least because one zeroing mask may cover an interference component that is missed by the other zeroing mask). Further, computing and applying global thresholds when generating zeroing masks, rather than computing and applying thresholds on a row-by-row basis, may advantageously improve processing speed of the radar system when performing interference cancellation.

Figure 12:
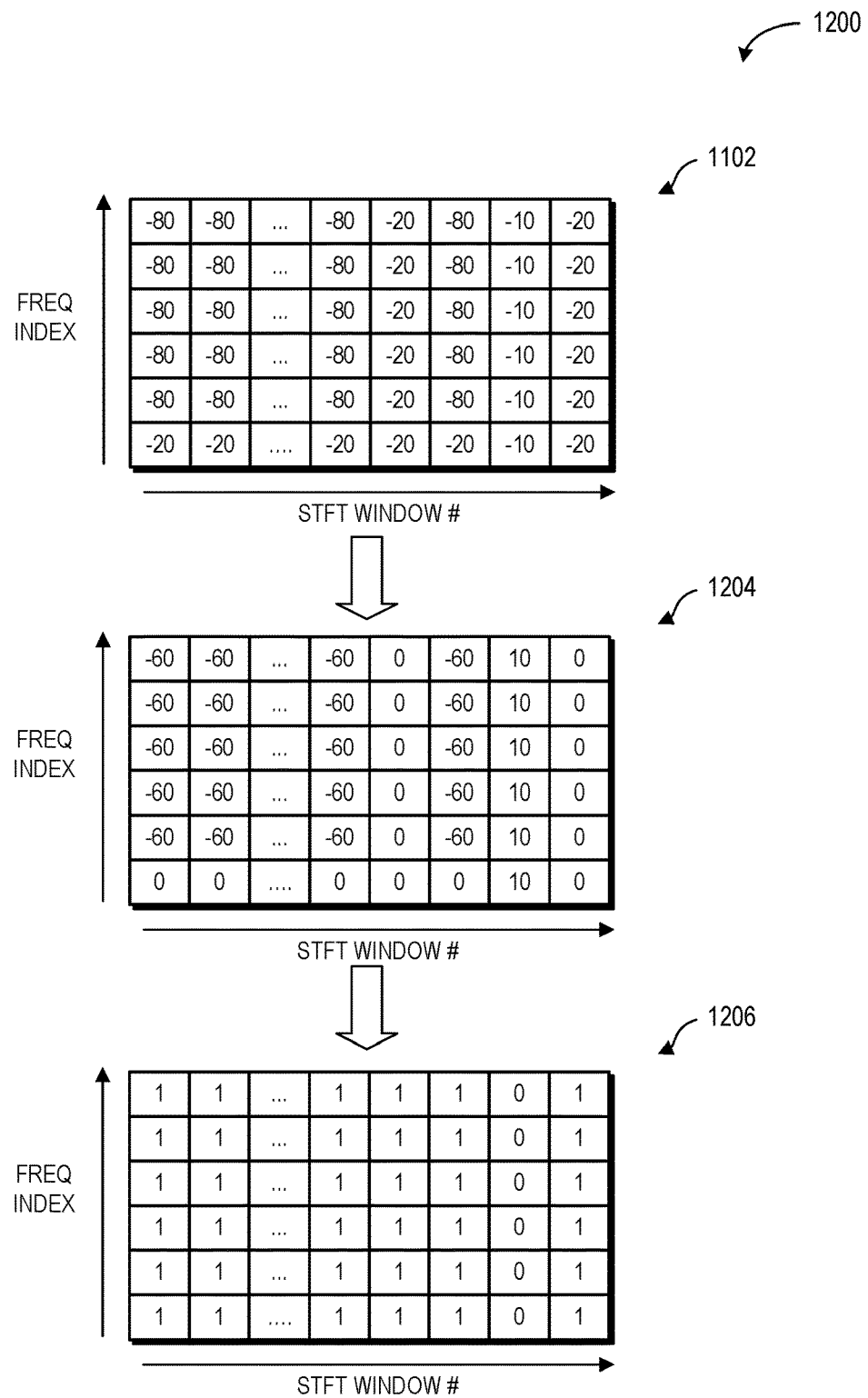
FIG. 12 shows a sequence of matrices that may be generated when computing a first zeroing mask as part of a time-frequency-domain spectrogram thresholding and zeroing interference cancellation process based on a global MAX-of-MIN-of-MAX approach, in accordance with various embodiments.

FIG. 12 shows matrices 1200 that may be generated when computing a first global threshold and first zeroing mask as part of an interference suppression or interference cancellation process performed by a signal processor of a radar system, such as the radar apparatus 200 of FIG. 2 or the radar system 500 of FIG. 5, as non-limiting examples. One or more elements in the present example may be similar to corresponding elements of FIG. 11, and like reference numerals refer to like elements. Some aspects of such elements that have already been described are not repeated here for sake of brevity.

The matrices 1200 may include a matrix 1102, a matrix 1204, and a matrix 1206. The signal processor may generate the matrix 1102 (e.g., at blocks 1004 and 1006 of the method 1000 of FIG. 10) by computing a spectrogram (e.g., using a STFT) based on raw ADC signals representing reflected signals received via one or more sets of receiver circuitry (e.g., with each set including at least one RX antenna, a receiver module, and an ADC), then computing the respective magnitudes of each cell of the spectrogram to a matrix of spectrogram magnitudes. The signal processor may determine a MIN-of-MAX value for each row of the matrix 1102 (e.g., at block 1008 of FIG. 10), then determine a MAX-of-MIN-of-MAX value from the determined MIN-of-MAX values, then subtract the MAX-of-MIN-of-MAX value from each cell of the matrix 1102 to generate the matrix 1204. In the present example, the MIN-of-MAX value for the first frequency signal in the matrix 1102 is −20 dB and the MIN-of-MAX values for the other frequency signals in the matrix 1102 are −80 dB. The MAX-of-MIN-of-MAX value for the matrix 1102 is −20 dB.

The signal processor may then generate the matrix 1206 by comparing each cell value of the matrix 1204 to a threshold (e.g., around 3 dB). The signal processor may set any cell of the matrix 1204 having a value exceeding this threshold to a first binary value (e.g., 0) and set any cell of the matrix 1204 having a value less than or equal to the threshold to a second binary value (e.g., 1) to generate the matrix 1206. In this way, the signal processor effectively compares the cell value of each cell of the matrix 1102 to a first global threshold of THG1=MAX-of-MIN-of-MAX+Y, where Y is a predetermined offset (e.g., around 3 dB).

The signal processor may apply the matrix 1206 as a first mask (sometimes referred to herein as a "first zeroing mask") to the spectrogram from which the matrix 1102 was derived (e.g., using an element-wise product or "dot" product) to remove interference components (i.e., cells affected by interference), thereby producing an interference-suppressed spectrogram. This first zeroing mask may be applied to the spectrogram together with a second zeroing mask (e.g., generated at block 1020 of FIG. 10) in order to generate the interference-suppressed spectrogram. The signal processor may then convert the interference-suppressed spectrogram back to the time domain using an iSTFT (e.g., at block 1024 of FIG. 10) to produce interference-suppressed ADC signals.

The generation of the matrix 1204 in the present example is intended to be illustrative and not limiting. In one or more other embodiments, for example, the signal processor may perform a threshold comparison for each cell of the matrix 1102 using a first global threshold of THG1=MAX-of-MIN-of-MAX+Y, where Y is a predetermined offset (e.g., around 3 dB). The signal processor may then generate the matrix 1206 by setting any cell of the matrix 1102 having a value exceeding the first global threshold to a first binary value (e.g., 0) and setting any cell of the matrix 1102 having a value less than or equal to the first global threshold to a second binary value (e.g., 1). In one or more such embodiments, the generation of the matrix 1204 may be omitted.

Figure 13:
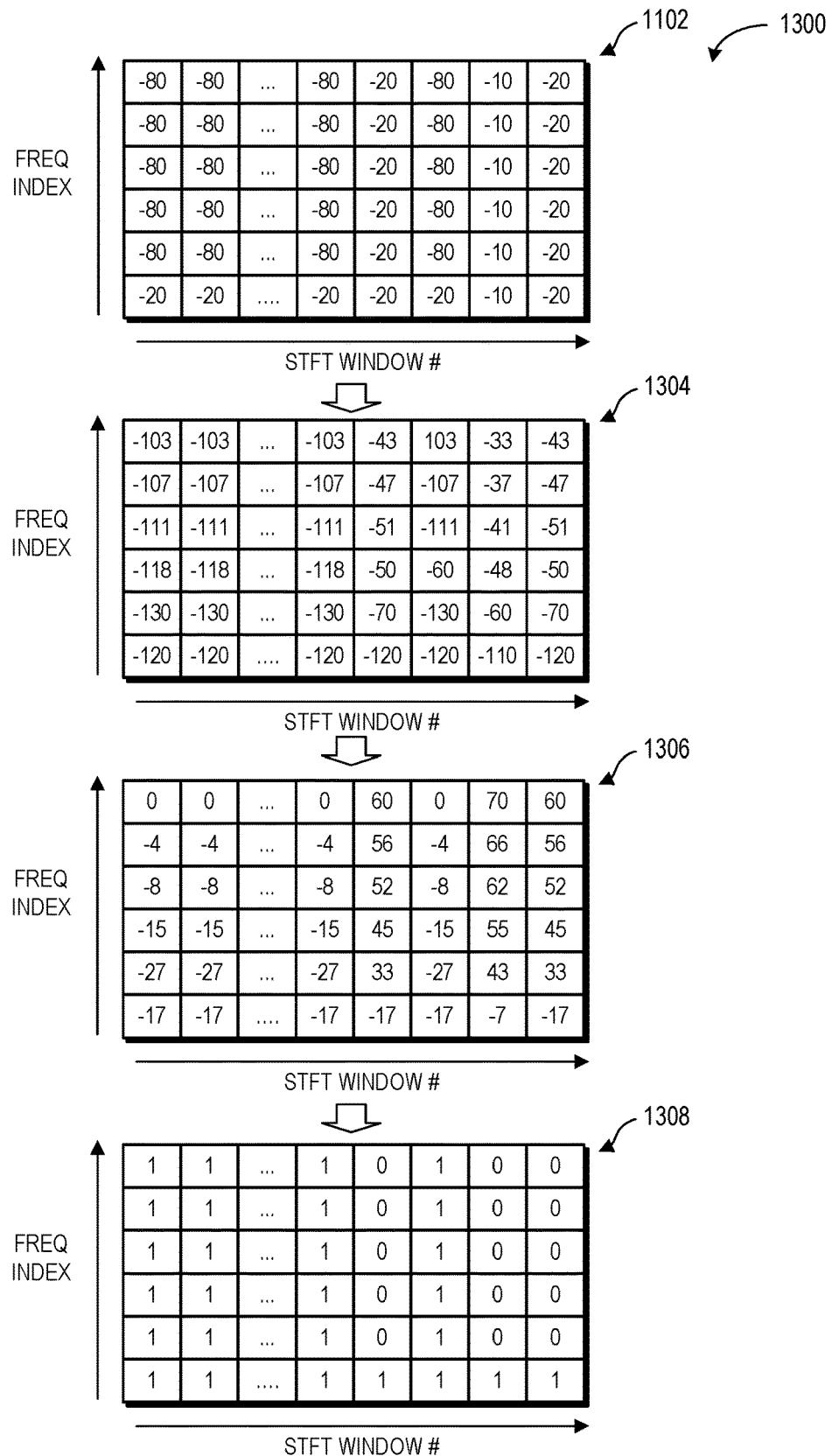
FIG. 13 shows a sequence of matrices that may be generated when computing a first zeroing mask as part of a time-frequency-domain spectrogram thresholding and zeroing interference cancellation process based on a global MAX-of-MIN-of-MAX approach, in accordance with various embodiments.

FIG. 13 shows matrices 1300 that may be generated when computing a second global threshold and second zeroing mask as part of an interference suppression or interference cancellation process performed by a signal processor of a radar system, such as the radar apparatus 200 of FIG. 2 or the radar system 500 of FIG. 5, as non-limiting examples. One or more elements in the present example may be similar to corresponding elements of FIG. 11, and like reference numerals refer to like elements. Some aspects of such elements that have already been described are not repeated here for sake of brevity.

The matrices 1300 may include a matrix 1102, a matrix 1304, and a matrix 1306. The signal processor may generate the matrix 1102 (e.g., at blocks 1004 and 1006 of the method 1000 of FIG. 10) by computing a spectrogram (e.g., using a STFT) based on raw ADC signals representing reflected signals received via one or more sets of receiver circuitry (e.g., with each set including at least one RX antenna, a receiver module, and an ADC), then computing the respective magnitudes of each cell of the spectrogram to generate a matrix of spectrogram magnitudes. The signal processor may apply an HPF response to the matrix 1102 (e.g., by computing, for each column of the matrix 1102, the element-wise sum of a 1D array of FIR weights and that column) to generate the matrix 1304 as a weighted matrix of spectrogram magnitudes. The signal processor may determine a MIN-of-MAX value for each row of the matrix 1304 (e.g., at block 1016 of FIG. 10), then determine a MAX-of-MIN-of-MAX value from the determined MIN-of-MAX values, then subtract the MAX-of-MIN-of-MAX value from each cell of the matrix 1102 to generate the matrix 1306.

In the present example, the matrix 1304 is generated by calculating the element wise sum of an array of FIR weights given as [−100, −50, −38, −31, −27, −23, −20] with each column of the matrix 1102. The MIN-of-MAX values for the rows of the matrix 1304 may be given, from bottom to top, as [−120, −130, −118, −111, −107, −103]. Continuing the example, the MAX-of-MIN-of-MAX of the matrix 1304, in view of the given MIN-of-MAX values, is −103 dB, such that the value −103 is subtracted from each cell of the matrix 1304 to generate the matrix 1306.

The signal processor may then generate the matrix 1308 by comparing each cell value of the matrix 1306 to a threshold (e.g., around 3 dB). The signal processor may set any cell of the matrix 1306 having a value exceeding this threshold to a first binary value (e.g., 0) and set any cell of the matrix 1306 having a value less than or equal to the threshold to a second binary value (e.g., 1) to generate the matrix 1308. In this way, the signal processor effectively compares the cell value of each cell of the matrix 1304 to a second global threshold of THG2=MAX-of-MIN-of-MAX+Y, where Y is a predetermined offset (e.g., around 3 dB).

The generation of the matrix 1306 in the present example is intended to be illustrative and not limiting. In one or more other embodiments, for example, the signal processor may perform a threshold comparison for each cell of the matrix 1304 using a second global threshold of THG2=MAX-of-MIN-of-MAX+Y, where Y is a predetermined offset (e.g., around 3 dB). The signal processor may then generate the matrix 1308 by setting any cell of the matrix 1304 having a value exceeding the second global threshold to a first binary value (e.g., 0) and setting any cell of the matrix 1304 having a value less than or equal to the second global threshold to a second binary value (e.g., 1). In one or more such embodiments, the generation of the matrix 1306 may be omitted.

The signal processor may apply the matrix 1308 as a second mask (sometimes referred to herein as a "second zeroing mask") to the spectrogram from which the matrix 1102 was derived (e.g., using an element-wise product or "dot" product) to remove interference components (i.e., cells affected by interference), thereby producing an interference-suppressed spectrogram. This second zeroing mask may be applied to the spectrogram together with a first zeroing mask (e.g., generated at block 1012 of FIG. 10) in order to generate the interference-suppressed spectrogram. The signal processor may then convert the interference-suppressed spectrogram back to the time domain using an iSTFT (e.g., at block 1024 of FIG. 10) to produce interference-suppressed ADC signals.

As examples, the Specification describes and/or illustrates aspects useful for implementing the claimed disclosure by way of various circuits or circuitry which may be illustrated as or using terms such as blocks, modules, device, system, unit, controller, communication circuitry, processing circuitry, transmitter, receiver, and/or other circuit-type depictions (e.g., elements 110, 120, 130, 132 and 134 of FIG. 1, elements 210, 220 and 230 of FIG. 2, and elements 502, 504, 506, 510, 512, 514, 516, 518, 522, 524, 528, 530, 532, 534, 536, 538, 540 of FIG. 5 may depict a block/module as described herein). Such circuits or circuitry may be used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing one or more of the various processing steps noted herein, such as may include converting reflections into the time-frequency domain, determining a suppression threshold, and constructing a range response with interference suppressed. Yet another process or method in this context would be recognized in connection with the functions/activities associated with the various method-based blocks in FIGS. 3, 4, 6, 7, and 10.

For example, in certain of the above-discussed embodiments, one or more modules are discrete logic circuits or programmable logic circuits configured and arranged for implementing these operations/activities, as may be carried out in the approaches shown in FIGS. 3, 4, 6, 7, and 10. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described here is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, certain embodiments may be implemented as a circuit or circuit block implemented in a receiver, for carrying out the interference suppression, and may otherwise be utilized with a variety of types of radar communication circuitry. As another example, one or more additional circuits implementing transmission or reception of radar signals/reflections may be utilized. Such modifications do not depart from the true spirit and scope of various aspects of the disclosure, including aspects set forth in the claims.

What is claimed is:

1. A radar system comprising:
   communication circuitry configured to transmit radar signals and to receive reflections of the transmitted radar signals reflected by an object in an environment of the radar system; and
   processing circuitry configured to:
      generate a spectrogram by converting samples of the reflections into a time-frequency domain;
      determine at least one threshold based on at least one MIN-of-MAX value for magnitudes of a frequency signal of the spectrogram;
      generate an interference-suppressed spectrogram by removing or attenuating interference components from the spectrogram based on the at least one threshold; and
      generate interference-suppressed samples based on the interference-suppressed spectrogram.

2. The radar system of claim 1, wherein the processing circuitry is configured to generate the spectrogram by performing a Short Time Fourier Transform (STFT) on the samples of the reflections.

3. The radar system of claim 2, wherein the processing circuitry is configured to generate the interference-suppressed samples by performing an inverse STFT on the interference-suppressed spectrogram.

4. The radar system of claim 1, wherein the processing circuitry is configured to determine the at least one threshold by:
   determining, as thresholds, MIN-of-MAX values for each of the frequency signals of the spectrogram.

5. The radar system of claim 4, wherein the processing circuitry is configured to generate the interference-suppressed spectrogram by:
   identifying cells of the spectrogram having magnitudes exceeding respective MIN-of-MAX values determined for respective frequency signals of those cells; and
   generating the interference-suppressed spectrogram by setting cell values of the identified cells of the spectrogram to zero.

6. The radar system of claim 1, wherein the at least one threshold includes a first global threshold, and the processing circuitry is further configured to determine the at least one threshold by:
   determining a first set of MIN-of-MAX values including a respective MIN-of-MAX value for each frequency signal of the spectrogram; and
   determining the first global threshold based on a maximum of the first set of MIN-of-MAX values.

7. The radar system of claim 6, wherein the processing circuitry is configured to generate a first zeroing mask by:
   setting each cell of the spectrogram having a magnitude that exceeds the first global threshold to zero; and
   setting each cell of the spectrogram having a magnitude that is less than or equal to the first global threshold to one.

8. The radar system of claim 7, wherein the at least one threshold further includes a second global threshold, and the processing circuitry is further configured to determine the at least one threshold by:
   generating a matrix of spectrogram magnitudes for the spectrogram;
   applying a high pass filter response to the matrix of spectrogram magnitudes to generate a weighted matrix of spectrogram magnitudes;
   determining a second set of MIN-of-MAX values including a respective MIN-of-MAX value for each frequency signal of the weighted matrix of spectrogram magnitudes; and
   determining the second global threshold based on a maximum of the second set of MIN-of-MAX values.

9. The radar system of claim 8, wherein the processing circuitry is configured to generate a second zeroing mask by:
   setting each cell of the weighted matrix of spectrogram magnitudes having a cell value that exceeds the second global threshold to zero; and
   setting each cell of the weighted matrix of spectrogram magnitudes having a cell value that is less than or equal to the second global threshold to one.

10. The radar system of claim 9, wherein the processing circuitry is configured to generate the interference-suppressed spectrogram by computing the element-wise product of each of the spectrogram and each of the first zeroing mask and the second zeroing mask.

11. A method comprising:
    generating, by processing circuitry of a radar system, a spectrogram by converting samples, of reflections of transmitted radar signals reflected by an object in an environment of the radar system, into a time-frequency domain;
    determining, by the processing circuitry, at least one threshold based on at least one MIN-of-MAX value for magnitudes of a frequency signal of the spectrogram;
    generating, by the processing circuitry, an interference-suppressed spectrogram by removing or attenuating interference components from the spectrogram based on the at least one threshold; and
    generating, by the processing circuitry, interference-suppressed samples based on the interference-suppressed spectrogram.

12. The method of claim 11, wherein generating the spectrogram includes:
    performing a Short Time Fourier Transform (STFT) on the samples of the reflections.

13. The method of claim 12, wherein generating the interference-suppressed samples includes:
    performing an inverse STFT on the interference-suppressed spectrogram.

14. The method of claim 11, wherein determining the at least one threshold includes:
    determining, as thresholds, MIN-of-MAX values for each of the frequency signals of the spectrogram.

15. The method of claim 14, wherein generating the interference-suppressed spectrogram includes:
    identifying cells of the spectrogram having magnitudes exceeding respective MIN-of-MAX values determined for respective frequency signals of those cells; and
    generating the interference-suppressed spectrogram by setting cell values of the identified cells of the spectrogram to zero.

16. The method of claim 11, wherein the at least one threshold includes a first global threshold, and determining the at least one threshold includes:
    determining a first set of MIN-of-MAX values including a respective MIN-of-MAX value for each frequency signal of the spectrogram; and
    determining the first global threshold based on a maximum of the first set of MIN-of-MAX values.

17. The method of claim 16, further comprising:
    generating a first zeroing mask by:
        setting each cell of the spectrogram having a magnitude that exceeds the first global threshold to zero; and
        setting each cell of the spectrogram having a magnitude that is less than or equal to the first global threshold to one.

18. The method of claim 17, wherein the at least one threshold further includes a second global threshold, and determining the at least one threshold further includes:
    generating a matrix of spectrogram magnitudes for the spectrogram;
    applying a high pass filter response to the matrix of spectrogram magnitudes to generate a weighted matrix of spectrogram magnitudes;
    determining a second set of MIN-of-MAX values including a respective MIN-of-MAX value for each frequency signal of the weighted matrix of spectrogram magnitudes; and
    determining the second global threshold based on a maximum of the second set of MIN-of-MAX values.

19. The method of claim 18, further comprising:
    generating a second zeroing mask by:
        setting each cell of the weighted matrix of spectrogram magnitudes having a cell value that exceeds the second global threshold to zero; and
        setting each cell of the weighted matrix of spectrogram magnitudes having a cell value that is less than or equal to the second global threshold to one.

20. The method of claim 19, wherein generating the interference-suppressed spectrogram includes:
    computing the element-wise product of each of the spectrogram and each of the first zeroing mask and the second zeroing mask.

* * * * *